US008809980B2

(12) United States Patent
Nakatani

(10) Patent No.: US 8,809,980 B2
(45) Date of Patent: Aug. 19, 2014

(54) INFRARED SENSOR

(75) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 214 days.

(21) Appl. No.: 12/929,969

(22) Filed: Feb. 28, 2011

(65) Prior Publication Data

US 2011/0210414 A1  Sep. 1, 2011

(30) Foreign Application Priority Data

Mar. 1, 2010  (JP) ................................ 2010-044180

(51) Int. Cl.
*H01L 31/18*  (2006.01)
*G01J 5/02*  (2006.01)
*G01J 5/08*  (2006.01)
*G01J 5/34*  (2006.01)

(52) U.S. Cl.
CPC ............. *G01J 5/34* (2013.01); *G01J 5/0225* (2013.01); *G01J 5/024* (2013.01); *G01J 5/02* (2013.01); *G01J 5/0846* (2013.01); *G01J 5/08* (2013.01)
USPC .... 257/428; 257/431; 257/467; 257/E25.029; 257/E21.215; 374/121; 374/132; 250/338.1; 250/338.2; 250/338.4

(58) Field of Classification Search
USPC .......... 257/428, 431, 467, E25.029, E21.215; 374/121, 132; 250/338.1, 338.2, 338.4
See application file for complete search history.

(56) References Cited

U.S. PATENT DOCUMENTS

| | | | | |
|---|---|---|---|---|
| 6,326,621 | B1 * | 12/2001 | Kamada et al. | 250/338.2 |
| 2006/0281316 | A1 * | 12/2006 | Komuro et al. | 438/694 |
| 2007/0278545 | A1 * | 12/2007 | Kijima | 257/295 |
| 2008/0170982 | A1 * | 7/2008 | Zhang et al. | 423/447.3 |
| 2009/0278212 | A1 * | 11/2009 | Ishida et al. | 257/414 |
| 2010/0013975 | A1 * | 1/2010 | Nakashima et al. | 348/308 |

FOREIGN PATENT DOCUMENTS

| | | |
|---|---|---|
| JP | 06-094521 A | 4/1994 |
| JP | 2009-079946 A | 4/2009 |

* cited by examiner

*Primary Examiner* — Michael Shingleton
(74) *Attorney, Agent, or Firm* — Rabin & Berdo, P.C.

(57) ABSTRACT

An infrared sensor according to the present invention includes a semiconductor substrate, a thin-film pyroelectric element made of lead titanate zirconate and disposed on the semiconductor substrate, a coating film coating the pyroelectric element and having a topmost surface that forms a light receiving surface for infrared rays, and a cavity formed to a shape dug in from a top surface of the semiconductor substrate at a portion opposite to the pyroelectric element and thermally isolates the pyroelectric element from the semiconductor substrate.

33 Claims, 22 Drawing Sheets

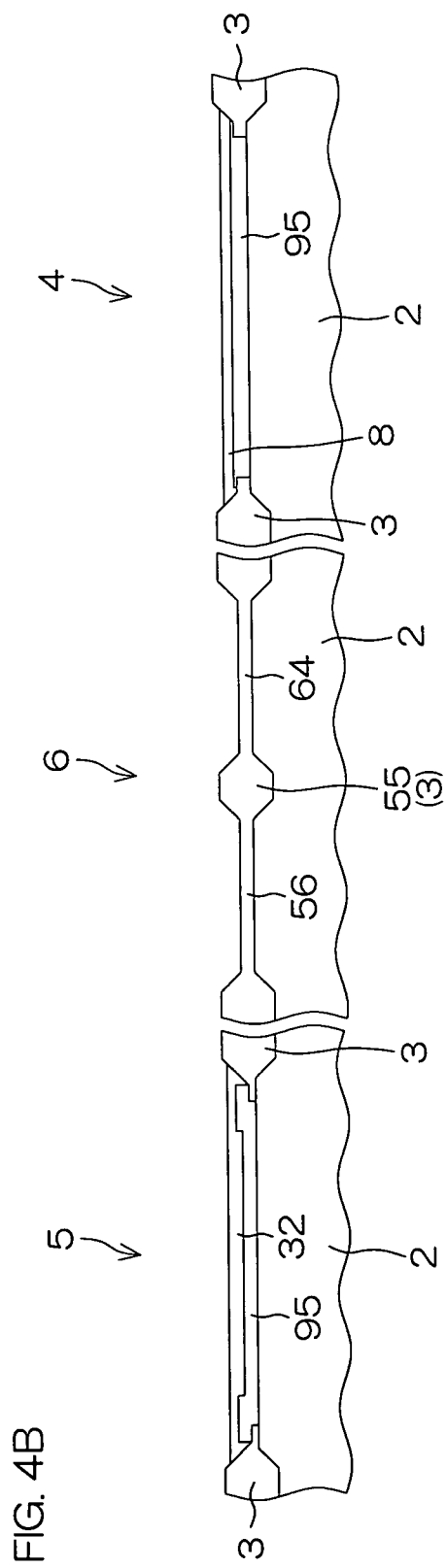

ND SENSOR

BACKGROUND OF THE INVENTION

1. Field of the Invention

The present invention relates to an infrared sensor that detects infrared rays.

2. Description of Related Art

Infrared sensors are largely classified into thermal-type infrared sensors that make use of a temperature change of a thin film due to reception of infrared rays and quantum-type infrared sensors that make use of an electrical phenomenon (photoelectric conversion) that occurs in a semiconductor material due to light energy of infrared rays. Thermal-type infrared sensors, though being low in detection sensitivity and response speed in comparison to quantum-type infrared sensors, are wide in detection wavelength bandwidth, can be used at room temperature, and are thus widely used in thermography, radiation thermometers, etc.

As thermal-type infrared sensors, thermopiles that detect infrared rays by a thermoelectric effect, and pyroelectric sensors (pyrosensors) that detect infrared rays by a pyroelectric effect are known.

A thermopile has a structure in which a thin film is formed on a substrate and a thermocouple is, disposed on the thin film. A cavity is formed in the substrate, and the thin film is disposed so as to close the cavity from a top surface side of the substrate. The thermocouple has its hot junction and cold junction thermally isolated by the hot junction being disposed at a position opposite to the cavity and the cold junction being disposed at a position opposite to a portion of the substrate at a periphery of the cavity. When a temperature of the thin film rises due to infrared rays, a temperature difference arises between the hot junction and the cold junction of the thermocouple, and a voltage that is in accordance with the temperature difference is output as a detection signal.

With the thermopile, the same materials as materials used in an IC chip or other semiconductor device is used. That is, for example, silicon (Si), silicon oxide ($SiO_2$), and polysilicon are used as the materials of the substrate, the thin film, and the thermocouple. The thermopile can thus be formed on the same substrate as a circuit for processing its detection signal, etc.

A pyroelectric sensor has a structure where a ceramic (bulk ceramic) formed by sintering a powder raw material is sealed inside a package. The ceramic is made to have an intrinsic polarization by a polarization treatment. When a temperature of the ceramic rises due to infrared rays, the intrinsic polarization of the ceramic changes according to the temperature, charges arise on a surface of the ceramic, and a flow of the charges (pyroelectric current) is output as a detection signal.

SUMMARY OF THE INVENTION

With the pyroelectric sensor, the sintered ceramic is used as a pyroelectric element and thus the pyroelectric element is disposed separately from an IC chip that includes a signal processing circuit. Also, the sintered ceramic is difficult to make thin and a thickness limit thereof is approximately 100 μm. Thus, with the pyroelectric sensor, there is a problem that an overall size is large.

An object of the present invention is to provide an infrared sensor, with which thinness is achieved with a structure using a pyroelectric element, and a method for manufacturing the infrared sensor.

The above and further objects, characteristics, and effects of the present invention shall be made clear by the following description of the preferred embodiment made with reference to the attached drawings.

DETAILED DESCRIPTION OF PREFERRED EMBODIMENTS

Figure 1:
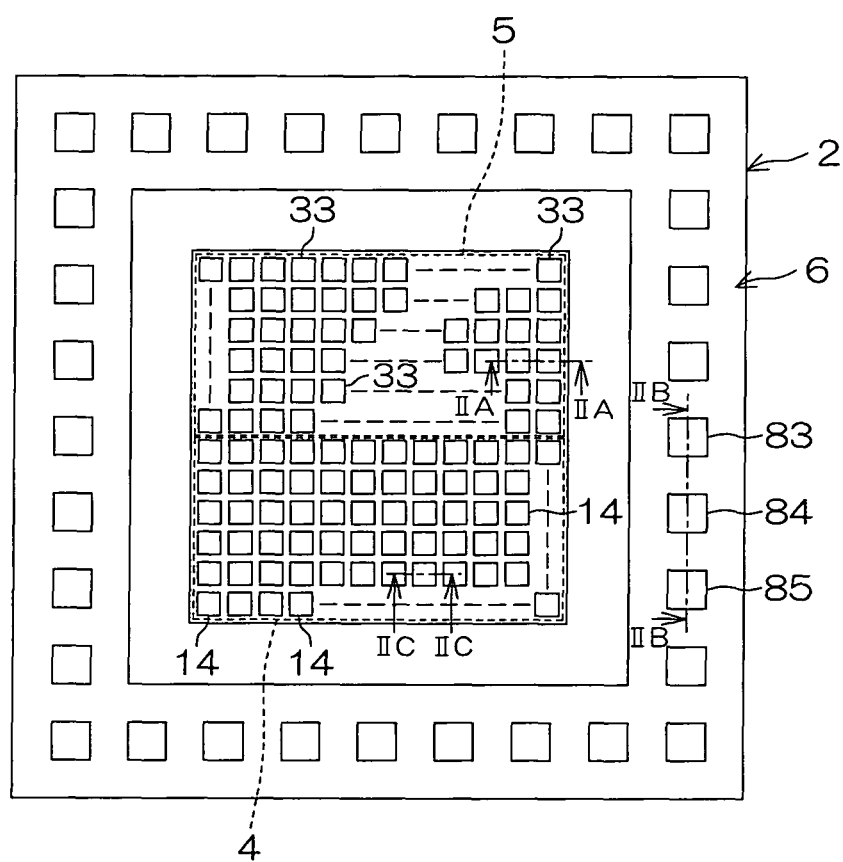
FIG. 1 is a layout diagram of an infrared sensor according to a preferred embodiment of the present invention.

An infrared sensor according to a first aspect of the present invention includes a semiconductor substrate, a thin-film pyroelectric element made of lead titanate zirconate and disposed on the semiconductor substrate, a coating film coating the pyroelectric element and having a topmost surface forming a light receiving surface for infrared rays, and a cavity formed to a shape dug in from a top surface of the semiconductor substrate at a portion opposite to the pyroelectric element and thermally isolating the pyroelectric element from the semiconductor substrate.

The thin-film pyroelectric element made of lead titanium zirconate is disposed on the semiconductor substrate. When a temperature of the pyroelectric element rises due to incidence of infrared rays, a pyroelectric current due to a change of intrinsic polarization of the pyroelectric element is output in accordance with the temperature. The infrared rays can thus be detected based on the pyroelectric current.

The cavity of the shape dug in from the top surface of the semiconductor substrate is formed at the portion of the substrate opposite to the pyroelectric element. The pyroelectric element is thereby thermally isolated from the semiconductor substrate and escape of heat from the pyroelectric element to the semiconductor substrate can thereby be prevented. Consequently, detection precision of infrared rays can be improved.

The thin-film pyroelectric element can be formed by a sol-gel method. With the sol-gel method, the thickness of the pyroelectric element can be made thinner in comparison to a method of forming the pyroelectric element by sintering of a powder raw material. The infrared sensor using the pyroelectric element can thus be made thin.

The pyroelectric element is coated by the coating film. The pyroelectric element can thereby be protected against water, etc. In particular, in a case where an alumina film is included in the coating film, hydrogen reduction of the lead titanate zirconate, which is the material of the pyroelectric element, can be prevented by a hydrogen barrier property of the alumina film. Degradation of characteristics of the pyroelectric element due to the hydrogen reduction can thus be prevented. Also, in the case where the alumina film is included in the coating film, the coating film preferably has a two-layer structure in which the alumina film and a silicon oxide film are laminated in that order from the semiconductor substrate side.

An active element may be formed in the semiconductor substrate.

The active element can be formed using the semiconductor substrate. Further, a wiring may be formed across an interlayer insulating film on the semiconductor substrate, and the wiring can be connected to the active element via a contact plug, etc. A signal processing circuit that processes the pyroelectric current (output signal) output from the pyroelectric element, etc., can thus be incorporated in the infrared sensor.

An infrared sensor including an active element and wirings can be manufactured by a manufacturing method that includes the following steps (1) to (6).
(1) A step of forming the active element in a semiconductor substrate,
(2) a step of forming an interlayer insulating film on the semiconductor substrate,
(3) a step of forming a contact so as to penetrate through the interlayer insulating film in a thickness direction thereof and so as to be electrically connected to the active element,
(4) a step of forming a thin-film pyroelectric element made of lead titanate zirconate on the interlayer insulating film by a sol-gel method,
(5) a step of coating the pyroelectric element with a coating film on the interlayer insulating film, after forming of the pyroelectric element and
(6) a step of forming, on the coating film, the wirings so as to be electrically connected to the active element and the pyroelectric element, respectively.

Also, a thermocouple may be disposed on the semiconductor substrate. In this case, infrared rays can be detected based on a voltage that is in accordance with a temperature difference between a hot junction and a cold junction of the thermocouple. Thus, either or both of the pyroelectric element and the thermocouple can be used as the infrared detecting element in accordance with application of the infrared sensor.

Preferably, in a case where the thermocouple includes the two thermocouples of a first thermocouple and a second thermocouple, the first thermocouple is made of a pair of a first conductive wire and a second conductive wire that are mutually spaced apart and extend in parallel, the second thermocouple is made of a pair of a third conductive wire and a fourth conductive wire that are mutually spaced apart and extend in parallel, one end of the first conductive wire and one end of the third conductive wire are connected, one end of the second conductive wire and one end of the fourth conductive wire are connected, and the connection portions form the hot junctions. In this case, a cavity for thermally isolating the hot junctions from the semiconductor substrate is preferably formed in the semiconductor substrate at a portion opposite to the thermocouple.

Also, the first conductive wire and the second conductive wire of the first thermocouple may be disposed so as to be 180° rotationally symmetric about a center of the cavity with respect to the third conductive wire and the fourth conductive wire of the second thermocouple in plan view.

The semiconductor substrate may be a silicon substrate, a through-hole penetrating through the coating film in a thickness direction may be formed in the coating film, and an inner surface of the through-hole may be coated with a silicon nitride film made of silicon nitride. When the inner surface of the through-hole is coated with the silicon nitride film, the coating film is not etched by an etching fluid even when the etching fluid is supplied to the silicon substrate via the through-hole to form the cavity in the silicon substrate. The cavity can thus be formed in the silicon substrate without undesired etching of the coating film.

Also, the cavity may be formed to have a trapezoidal cross-sectional shape that narrows as a rear surface of the semiconductor substrate is approached.

Also, the infrared sensor according to the first aspect of the present invention may further include a membrane closing the cavity from a top surface side of the semiconductor substrate, a lower electrode formed on the membrane and contacting the pyroelectric element from a rear surface of the pyroelectric element, and an upper electrode formed on the pyroelectric element and contacting the pyroelectric element from a top surface side of the pyroelectric element. In this case, the lower electrode preferably includes a main body portion being in contact with the pyroelectric element and an extending portion extending along a top surface of the semiconductor substrate from the main body portion. A wiring for supplying an electrical signal to the pyroelectric element can thereby be connected to the extending portion.

Also, the lower electrode may have a two-layer structure in which a layer made of titanium and a layer made of platinum are laminated in that order from the membrane side. Meanwhile, the upper electrode may have a two-layer structure in which a layer made of iridium and a layer made of iridium oxide are laminated in that order from the pyroelectric element side.

A preferred embodiment of the present invention shall now be described in detail with reference to the drawings.

Figure 2:
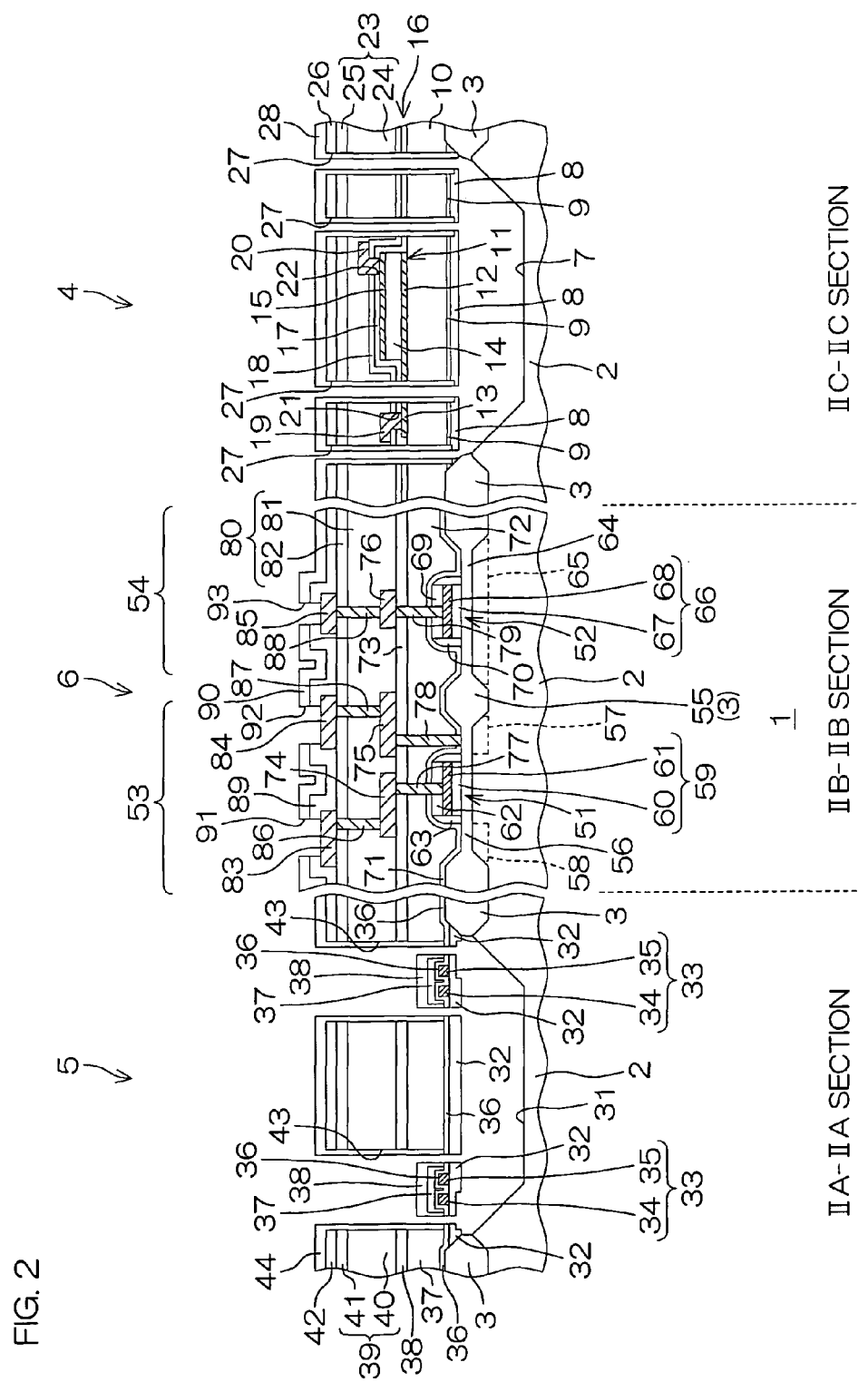
FIG. 2 is a schematic sectional view of the infrared sensor according to the preferred embodiment of the present invention.

FIG. 1 is a layout diagram of an infrared sensor according to a preferred embodiment of the present invention. FIG. 2 is a schematic sectional view of the infrared sensor according to the preferred embodiment of the present invention. With the respective diagrams from FIG. 2 onward, hatching is provided only on portions made of a conductor and hatching of other portions is omitted.

The infrared sensor 1 includes a silicon substrate 2 of square shape in plan view. A pyroelectric sensor region 4, a thermopile region 5, and a logic circuit region 6 are provided on the silicon substrate 2. The logic circuit region 6 is formed to a rectangular annular shape along a peripheral edge of the silicon substrate 2 and has a plurality of pads (second wirings 83 to 85, etc., to be described below) that are aligned in annular form along the peripheral edge of the silicon substrate 2. Meanwhile, the pyroelectric sensor region 4 and the thermopile region 5 are consolidated and formed in a central region of the silicon substrate 2 surrounded by the logic circuit region 6. Specifically, the pyroelectric sensor region 4 and the thermopile region 5 have pyroelectric elements 14 and thermocouples 33, respectively, as elements that detect infrared rays, and the elements 14 and 33 are consolidated and disposed in array form as a whole in the central region of the silicon substrate 2. A region in which the pyroelectric elements 14 are disposed makes up the pyroelectric sensor region 4 and the region in which the thermocouples 33 are disposed makes up the thermopile region 5.

Also, a LOCOS (local oxidation of silicon) film 3, which is a silicon oxide film formed by a LOCOS method, is formed in a top surface (upper surface) of the silicon substrate 2. The pyroelectric sensor region 4, the thermopile region 5, and the logic circuit region 6 are respectively surrounded individually and insulatingly isolated from each other by the LOCOS film 3.

Cavities 7 for thermally isolating the pyroelectric elements 14 to be described below from the silicon substrate 2 are formed in pyroelectric sensor region 4. Each cavity 7 is formed by digging in from the upper surface of the silicon substrate 2 and has a trapezoidal cross-sectional shape that narrows toward the lower side (as a rear surface of the silicon substrate 2 is approached).

A membrane 8 is formed to close the cavity 7 from above (top surface side of the silicon substrate 2). The membrane 8 is made of silicon nitride (SiN).

An etching stopper film 9 is formed on the membrane 8. An entire upper surface of the membrane 8 is covered by the etching stopper film 9. The etching stopper film 9 is made of silicon nitride (SiN).

A first interlayer insulating film 10 is laminated on the etching stopper film 9. An upper surface of the first interlayer insulating film 10 is flattened. The first interlayer insulating film 10 is made of BPSG (boron phospho silicate glass).

A lower electrode 11 is formed on the first interlayer insulating film 10. The lower electrode 11 integrally includes a main body portion 12 and an extending portion 13 extending from the main body portion 12. The lower electrode 11 has a two-layer structure in which a layer made of titanium (Ti) and a layer made of platinum (Pt) are laminated in that order from the first interlayer insulating film 10 side.

The pyroelectric element 14 is disposed on the main body portion 12 of the lower electrode 11. The main body portion 12 of the lower electrode 11 is thereby put in contact with a rear surface of the pyroelectric element 14. The pyroelectric element 14 is made of lead zirconate titanate (PZT: Pb (Zr, Ti) $O_3$) and is formed by a sol-gel method.

An upper electrode 15 is formed on the pyroelectric element 14 so as to cover an entire upper surface thereof. The upper electrode 15 is thereby put in contact with the top surface of the pyroelectric element 14. The upper electrode 15 has a two-layer structure in which a layer made of iridium (Ir) and a layer made of iridium oxide ($IrO_2$) are laminated in that order from the pyroelectric element 14 side.

A coating film 16 is formed on the first interlayer insulating film 10. Portions of the upper surface of the first interlayer insulating film 10 exposed from the lower electrode 11, the extending portion 13 of the lower electrode 11, side surfaces of the pyroelectric element 14, and the upper electrode 15 are coated all together by the coating film 16. The coating film 16 includes an alumina ($Al_2O_3$) film and a silicon oxide ($SiO_2$) film formed on the alumina film. That is, the coating film 16 has a two-layer structure in which the alumina film and the silicon oxide film are laminated in that order from the silicon substrate 2 side.

Wirings 19 and 20 are respectively formed in predetermined patterns on the coating film 16. The wirings 19 and 20 are formed of a metal material containing aluminum (Al) as a main component.

The wiring 19 is disposed at a position opposite to the extending portion 13 of the lower electrode 11 across the coating film 16. Between the wiring 19 and the extending portion 13, a through-hole 21 is formed to penetrate through the coating film 16 in the thickness direction. One end portion of the wiring 19 enters into the through-hole 21 and is connected to the extending portion 13. The other end portion of the wiring 19 is connected to a logic circuit formed in the logic circuit region 6.

The wiring 20 is disposed at a position opposite to the upper electrode 15 across the coating film 16. Between the wiring 20 and the upper electrode 15, a through-hole 22 is formed to penetrate through the coating film 16 in the thickness direction. One end portion of the wiring 20 enters into the through-hole 22 and is connected to the upper electrode 15. The other end portion of the wiring 20 is connected to the logic circuit formed in the logic circuit region 6.

A second interlayer insulating film 23 is laminated on the coating film 16. The second interlayer insulating film 23 includes a lower layer 24 having a flattened upper surface and an upper layer 25 laminated on the lower layer 24. The lower layer 24 and the upper layer 25 are made of silicon oxide.

A third interlayer insulating film 26 is laminated on the second interlayer insulating film 23. The third interlayer insulating film 26 is made of silicon oxide.

A plurality of through-holes 27 are formed to penetrate continuously through the membrane 8, the etching stopper film 9, the first interlayer insulating film 10, the coating film 16, the second interlayer insulating film 23, and the third interlayer insulating film 26. Some of the through-holes 27 penetrate through the extending portion 13 of the lower electrode 11. Each through-hole 27 is formed so that a portion that penetrates through the membrane 8 is smaller in size than the other portions, and a step is thereby formed on an inner surface of the through-hole 27 between the membrane 8 and the etching stopper film 9. Each through-hole 27 is in communication with the cavity 7.

A passivation film 28 is formed continuously across an upper surface of the third interlayer insulating film 26 and the inner surfaces of the respective through-holes 27. Inside each through-hole 27, the passivation film 28 has a thickness equivalent to the step formed on the inner surface of the through-hole 27. Inside each through-hole 27, the passivation film 28 coats the etching stopper film 9, the first interlayer insulating film 10, the coating film 16, the second interlayer insulating film 23, and the third interlayer insulating film 26 and a lower end thereof contacts an upper surface of the membrane 8. The passivation film 28 is made of silicon nitride, which is a material that enables an etching selection ratio to be secured with respect to silicon and silicon oxide.

Cavities 31 for thermally isolating hot junctions 45 of the thermocouples 33 to be described below from the silicon substrate 2 are formed in the thermopile region 5. Each cavity 31 is formed by digging in from the upper surface of the silicon substrate 2 and has a trapezoidal cross-sectional shape that narrows toward the lower side.

A membrane 32 is formed to close the cavity 31 from above. The membrane 32 is formed by the same process and in the same layer as the membrane 8 and is made of silicon nitride.

For example, two thermocouples 33 (a first thermocouple and a second thermocouple) are disposed on the membrane 32. Each of the thermocouples 33 is made up of a pair of conductive wires 34 and 35 that are mutually spaced apart and extend in parallel (first conductive wire/second conductive wire and third conductive wire/fourth conductive wire). One conductive wire 34 is made of a p-type polysilicon. The other conductive wire 35 is made of an n-type polysilicon.

Figure 3:
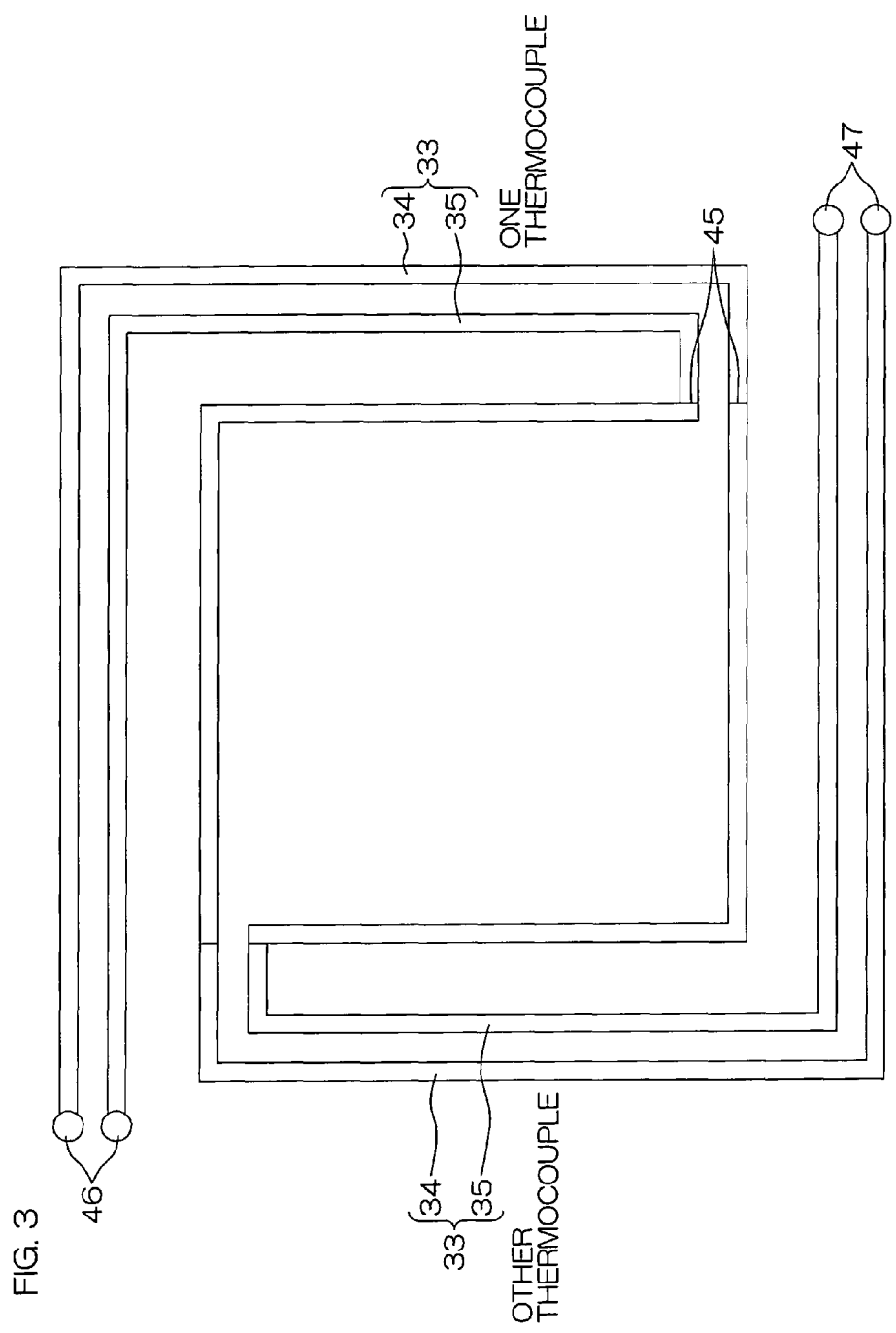
FIG. 3 is a diagrammatic plan view of a layout of thermocouples.

FIG. 3 is a diagrammatic plan view of a layout of the thermocouples.

As shown in FIGS. 2 and 3, ends at one side of the conductive wires 34 and 35 of one thermocouple 33 are respectively connected to ends at one side of the conductive wires 34 and 35 of the other thermocouple 33 at positions opposite to the cavity 31 across the membrane 32 and these connection portions form the hot junctions 45. The conductive wires 34 and 35 of one thermocouple 33 extend in one direction from the hot junctions 45, and after bending at 90° and then extending, bend at 90° again so as to fold back and then extend. The ends at the other side of the conductive wires 34 and 35 of the one thermocouple 33 are disposed at positions opposite to the silicon substrate 2 across the membrane 32, are connected mutually, and the connection portion forms cold junctions 46.

The conductive wires 34 and 35 of the other thermocouple 33 are disposed so as to be 180° rotationally symmetric about a center of the cavity 31 with respect to the conductive wires 35 and 34 of the one thermocouple 33 in plan view.

The other ends of the conductive wires 34 and 35 of the other thermocouple 33 are disposed at positions opposite to the silicon substrate 2 across the membrane 32 and form output terminals 47 for outputting a voltage that is in accordance with a temperature difference between the hot junctions 45 and the cold junctions 46 as an output signal. The output terminals 47 are connected to the logic circuit formed in the logic circuit region 6.

As shown in FIG. 2, an etching stopper film 36 is laminated on the membrane 32. Portions of the upper surface of the membrane 32 that are exposed from the thermocouples 33 and top surfaces of the thermocouples 33 are covered all together by the etching stopper film 36. The etching stopper film 36 is formed by the same process and in the same layer as the etching stopper film 9 and is made of silicon nitride.

A first interlayer insulating film 37 is laminated on the etching stopper film 36. The etching stopper film 36 has its entire top surface covered by the first interlayer insulating film 37. The first interlayer insulating film 37 is formed by the same process and in the same layer as the first interlayer insulating film 10 and is made of BPSG. Above the thermocouples 33, upper portions of the first interlayer insulating film 37 are removed from a plurality of regions of rectangular shape in plan view that extend along the thermocouples 33 and are adjacent to each other across microscopic spaces. The upper surface of the first interlayer insulating film 37 on the regions is thereby sunken with respect to the upper surface of the first interlayer insulating film 37 outside the regions. The upper surface of the first interlayer insulating film 37 outside the regions is flattened.

A cap layer 38 is laminated on the flattened first interlayer insulating film 37. The cap layer 38 is made of NSG (non-doped silicate glass).

A second interlayer insulating film 39 is laminated on the cap layer 38. The second interlayer insulating film 39 includes a lower layer 40 having a flattened upper surface and an upper layer 41 laminated on the lower layer 40. The lower layer 40 and the upper layer 41 are respectively formed by the same processes and in the same layers as the lower layer 24 and the upper layer 25 of the second interlayer insulating film 23 and both are made of silicon oxide.

A third interlayer insulating film 42 is laminated on the second interlayer insulating film 39. The third interlayer insulating film 42 is formed by the same process and in the same layer as the third interlayer insulating film 26 and is made of silicon oxide.

Through-holes 43 are formed at both sides of a direction orthogonal to longitudinal direction of each region of rectangular shape in plan view at which the upper surface of the first interlayer insulating film 37 is sunken. Each through-hole 43 has a length equal to a length in the longitudinal direction of the region of rectangular shape in plan view at its side and penetrates continuously through the membrane 32, the etching stopper film 36, and the first interlayer insulating film 37. Each through-hole 43 is formed so that a portion penetrating through the membrane 32 and the etching stopper film 36 is smaller in size than the other portion, and a step is thereby formed on an inner surface thereof between the etching stopper film 36 and the first interlayer insulating film 37. Each through-hole 43 is in communication with the cavity 31.

A passivation film 44 is formed on an upper surface of the third interlayer insulating film 42, and respective side surfaces of the first interlayer insulating film 37, the second interlayer insulating film 39, and the third interlayer insulating film 42. Inside each through-hole 43, the passivation film 44 has a thickness equivalent to the step formed on the inner surface of the through-hole 43. Also, inside each through-hole 43, a lower end of the passivation film 44 contacts an upper surface of the etching stopper 36. The passivation film 44 is formed by the same process and in the same layer as the passivation film 28 and is made of silicon nitride.

The logic circuit is formed in the logic circuit region 6. The logic circuit includes a MOSFET (metal oxide semiconductor field effect transistor) 51 and a MOS (metal oxide semiconductor) capacitor 52 and is for processing the signals input from the wirings 19 and 20 of the pyroelectric sensor region 4 and the signals input from the thermocouples 33 of the thermopile region 5.

In the logic circuit region 6, an FET region 53 in which the MOSFET 51 is formed and a capacitor region 54 in which the MOS capacitor 52 is formed are insulatingly separated from each other by a LOCOS film 55 formed in the top surface of the silicon substrate 2. Also, a p-type impurity is doped in the silicon substrate 2.

In the FET region 53, a gate insulating film 56 is formed on an entire top surface of the silicon substrate 2. The gate insulating film 56 is made of silicon oxide.

Also, in the FET region 53, an n-type source region 57 and a drain region 58 that are spaced apart are formed in a top layer portion of the silicon substrate 2.

On the gate insulating film 56, a gate electrode 59 is formed at a portion opposite to a region (channel region) between the source region 57 and the drain region 58. The gate electrode 59 has a structure in which a polysilicon layer 60 made of a doped polysilicon and a metal layer 61 made of a metal material are laminated in that order from the gate insulating film 56 side.

A gate cap film 62 is formed on the gate electrode 59. The gate cap film 62 is made of NSG.

A side wall 63 is formed along peripheries of the gate electrode 59 and the gate cap film 62. The side surfaces of the gate electrode 59 and the gate cap film 62 are surrounded and covered by the side wall 63. The side wall 63 is made of NSG.

In the capacitor region 54, a capacitor insulating film 64 is formed on the entire top surface of the silicon substrate 2.

Also, in the capacitor region 54, an n-type impurity diffusion region 65 is formed in a top layer portion of the silicon substrate 2.

An upper electrode 66 that is spaced apart from the LOCOS films 3 and 55 are formed on the capacitor insulating film 64. The upper electrode 66 has a structure in which a polysilicon layer 67 made of a doped polysilicon and a metal layer 68 made of a metal material are laminated in that order from the capacitor insulating film 64 side. The polysilicon layer 67 and the metal layer 68 are respectively formed in the same layers as the polysilicon layer 60 and the metal layer 61 of the gate electrode 59.

A capacitor cap film 69 is formed on the upper electrode 66. The capacitor cap film 69 is formed in the same layer as the gate cap film 62 on the gate electrode 59 and is made of NSG.

A side wall 70 is formed along peripheries of the upper electrode 66 and the capacitor cap film 69. The side surfaces of the upper electrode 66 and the capacitor cap film 69 are surrounded and covered by the side wall 70. The side wall 70 is formed by the same process as the side wall 63 and is made of NSG.

An etching stopper film 71 is laminated across the entire logic circuit region 6. The top surfaces of the LOCOS film 3 and 55, the respective upper surfaces of the gate insulating film 56, the gate cap film 62, capacitor insulating film 64, and the capacitor cap film 69, and the top surfaces of the side walls 63 and 70 are covered all together by the etching stopper film 71. The etching stopper film 71 is formed by the same process and in the same layer as the etching stopper films 9 and 36 and is made of silicon nitride.

A first interlayer insulating film 72 is laminated on the etching stopper film 71. The first interlayer insulating film 72 is formed by the same process and in the same layer as the first interlayer insulating films 10 and 37 and is made of BPSG. An upper surface of the first interlayer insulating film 72 is flattened.

A cap layer 73 is laminated on the first interlayer insulating film 72. The cap layer 73 is formed by the same process and in the same layer as the cap layer 38 and is made of NSG.

First wirings 74, 75, and 76 are respectively formed in predetermined patterns on the cap layer 73. The first wirings 74 to 76 are formed by the same process and in the same layer as the wirings 19 and 20 and are made of a metal material containing aluminum as a main component.

A portion of the first wiring 74 opposes the gate electrode 59. A via 77 is formed between this portion of the first wiring 74 and the gate electrode 59. The via 77 penetrates through the gate cap film 62, the etching stopper film 71, the first interlayer insulating film 72, and the cap layer 73, an upper end thereof is connected to the first wiring 74, and a lower end thereof is connected to the gate electrode 59. The via 77 is made of tungsten (W).

A portion of the first wiring 75 opposes the source region 57. A via 78 is formed between this portion of the first wiring 75 and the source region 57. The via 78 penetrates through the etching stopper film 71, the first interlayer insulating film 72, and the cap layer 73, an upper end thereof is connected to the first wiring 75, and a lower end thereof is connected to the source region 57. The via 78 is made of tungsten.

A portion of the first wiring 76 opposes the upper electrode 66. A via 79 is formed between this portion of the first wiring 76 and the upper electrode 66. The via 79 penetrates through the capacitor cap film 69, the etching stopper film 71, the first interlayer insulating film 72, and the cap layer 73, an upper end thereof is connected to the first wiring 76, and a lower end thereof is connected to the upper electrode 66. The via 79 is made of tungsten.

Also, a second interlayer insulating film 80 is laminated on the cap layer 73. The first wirings 74 to 76 are covered by the second interlayer insulating film 80. The second interlayer insulating film 80 includes a lower layer 81 having a flattened upper surface, and an upper layer 82 laminated on the lower layer 81. The lower layer 81 and the upper layer 82 are respectively formed by the same processes and in the same layers as the lower layer 24 and the upper layer 25 of the second interlayer insulating film 23 and are both made of silicon oxide.

Second wirings 83, 84, and 85 are respectively formed in predetermined patterns on the second interlayer insulating film 80. The second wirings 83 to 85 are made of a metal material containing aluminum as a main component.

A portion of the second wiring 83 opposes the first wiring 74. A via 86 is formed between this portion of the second wiring 83 and the first wiring 74. The via 86 penetrates through the second interlayer insulating film 80, an upper end thereof is connected to the second wiring 83, and a lower end thereof is connected to the first wiring 74. The via 86 is made of tungsten.

A portion of the second wiring 84 opposes the first wiring 75. A via 87 is formed between this portion of the second wiring 84 and the first wiring 75. The via 87 penetrates through the second interlayer insulating film 80, an upper end thereof is connected to the second wiring 84, and a lower end thereof is connected to the first wiring 75. The via 87 is made of tungsten.

A portion of the second wiring 85 opposes the first wiring 76. A via 88 is formed between this portion of the second wiring 85 and the first wiring 76. The via 88 penetrates through the second interlayer insulating film 80, an upper end thereof is connected to the second wiring 85, and a lower end thereof is connected to the first wiring 76. The via 88 is made of tungsten.

A third interlayer insulating film 89 is laminated on the second interlayer insulating film 80. The second wirings 83 to 85 are covered by the third interlayer insulating film 89. The third interlayer insulating film 89 is formed by the same process and in the same layer as the third interlayer insulating film 26 and is made of silicon oxide.

A passivation film 90 is laminated on the third interlayer insulating film 89. The passivation film 90 is formed by the same process and in the same layer as the passivation film 28 and is made of silicon nitride.

In the third interlayer insulating film 89 and the passivation film 90, pad openings 91, 92, and 93 are respectively formed at positions opposite to the second wirings 83 to 85. Upper surfaces of the second wirings 83 to 85 are thus exposed as pads for connection to an exterior via the pad openings 91, 92, and 93.

Figure 4A:
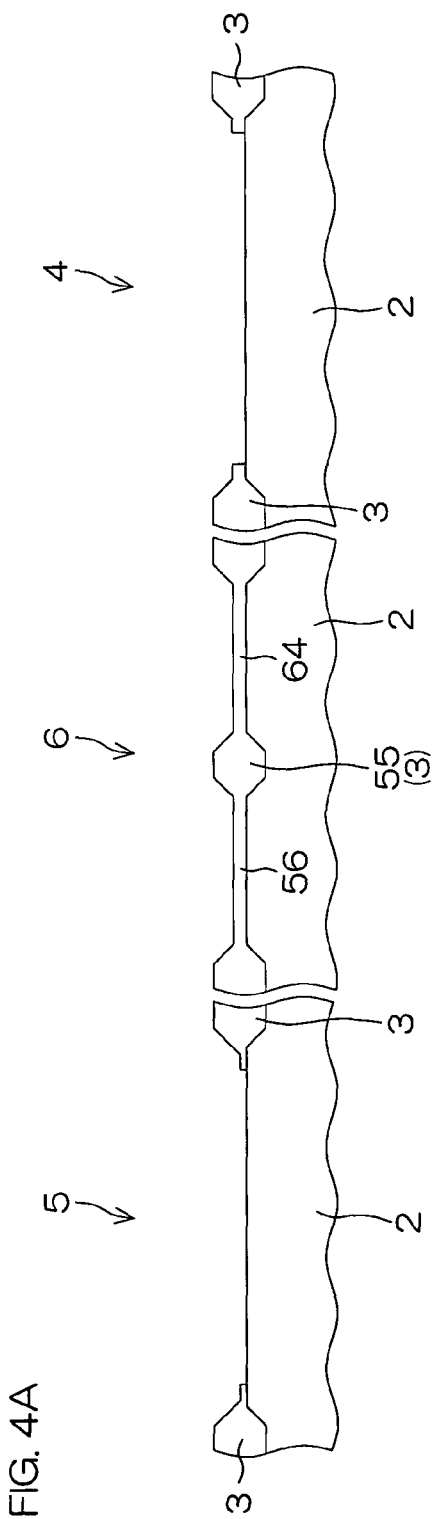
FIGS. 4A to 4S are schematic sectional views of a manufacturing process of the infrared sensor shown in FIG. 2.
Figure 4C:
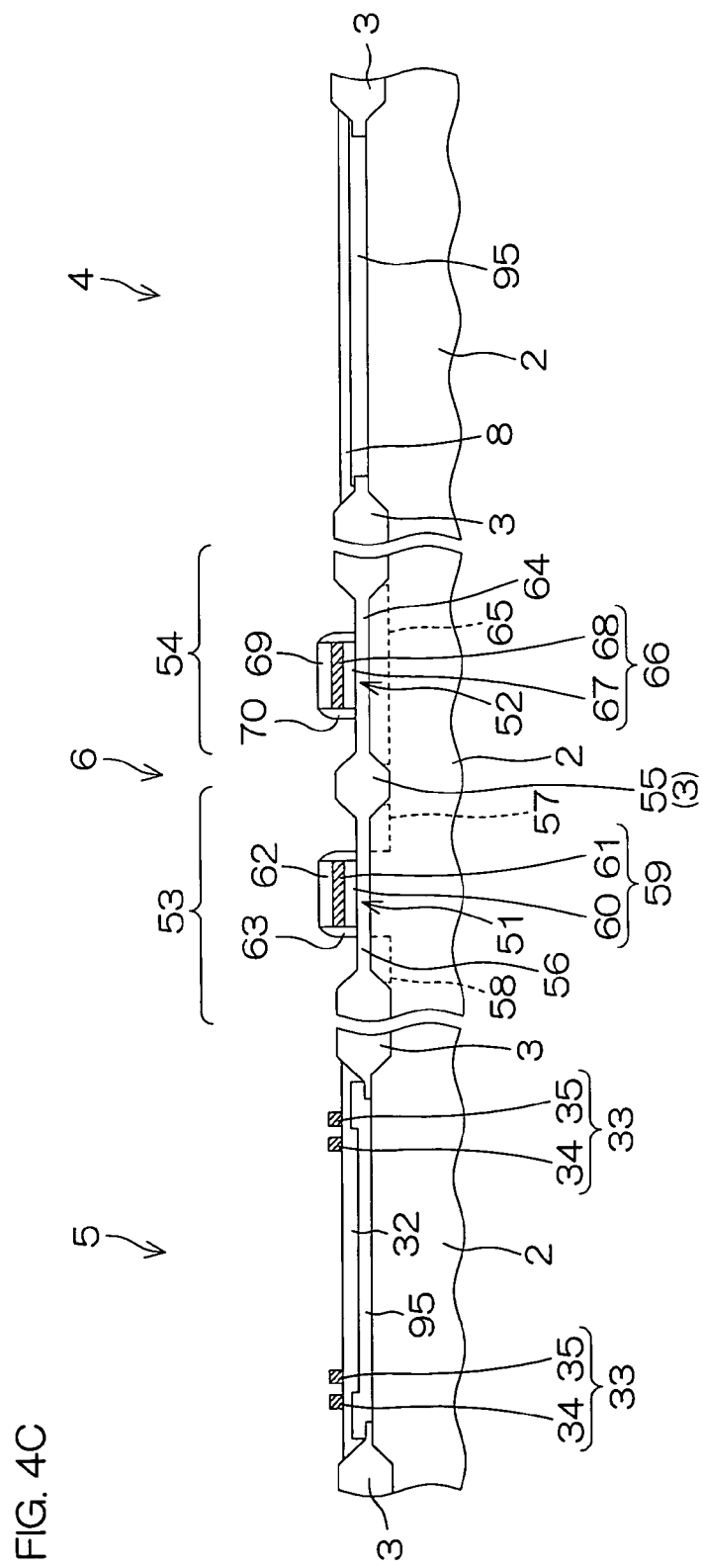
Figure 4D:
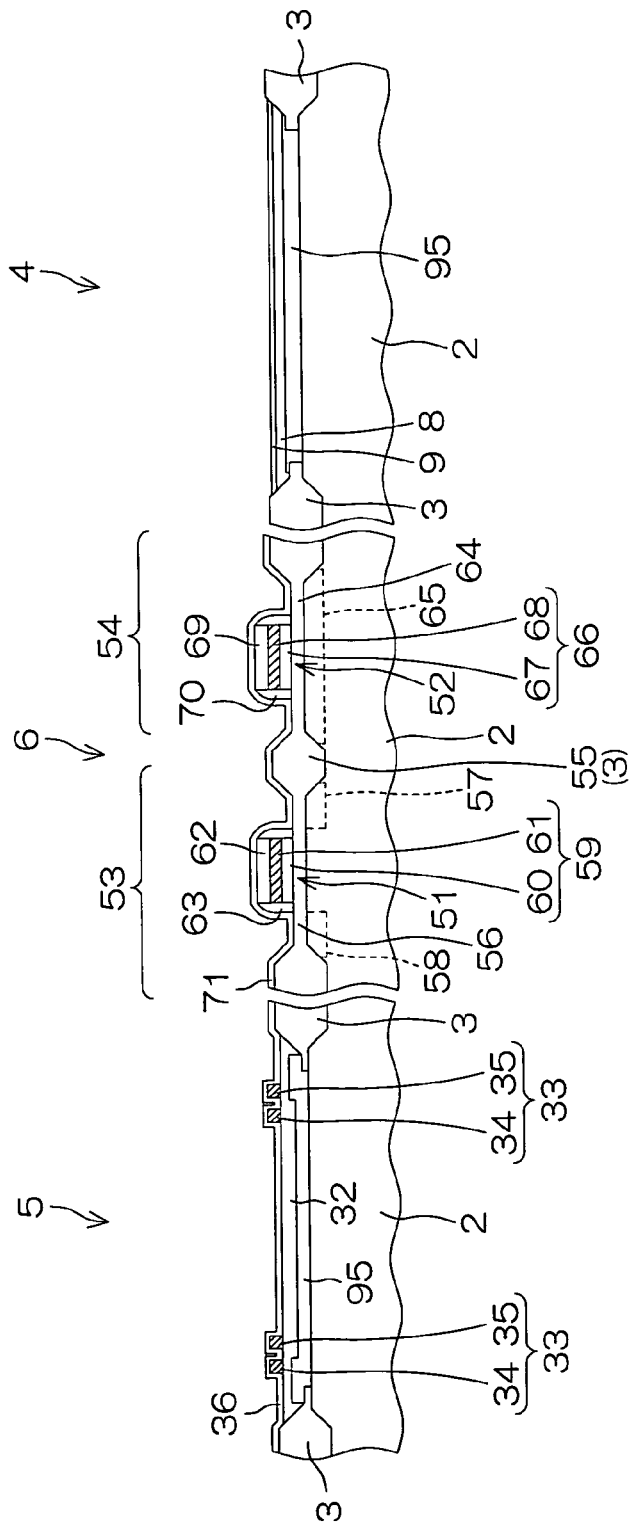
Figure 4E:
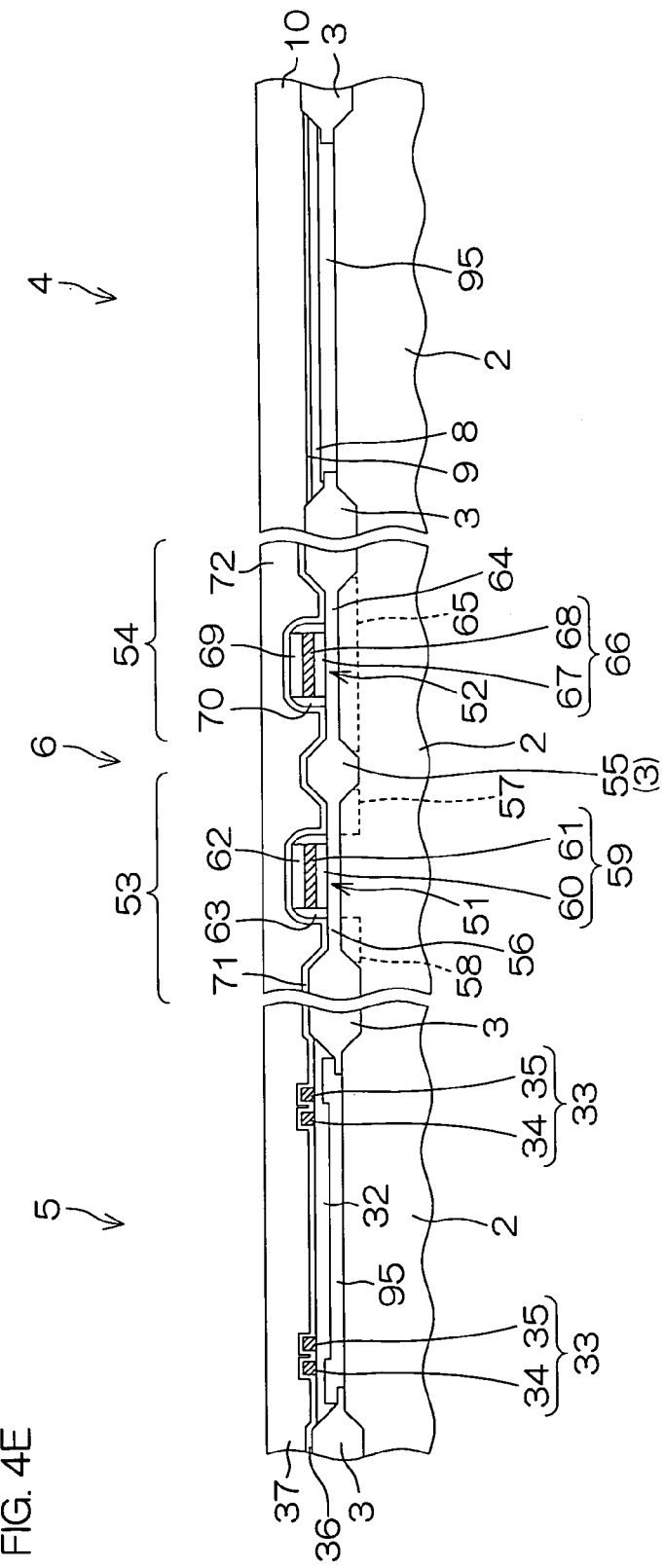
Figure 4F:
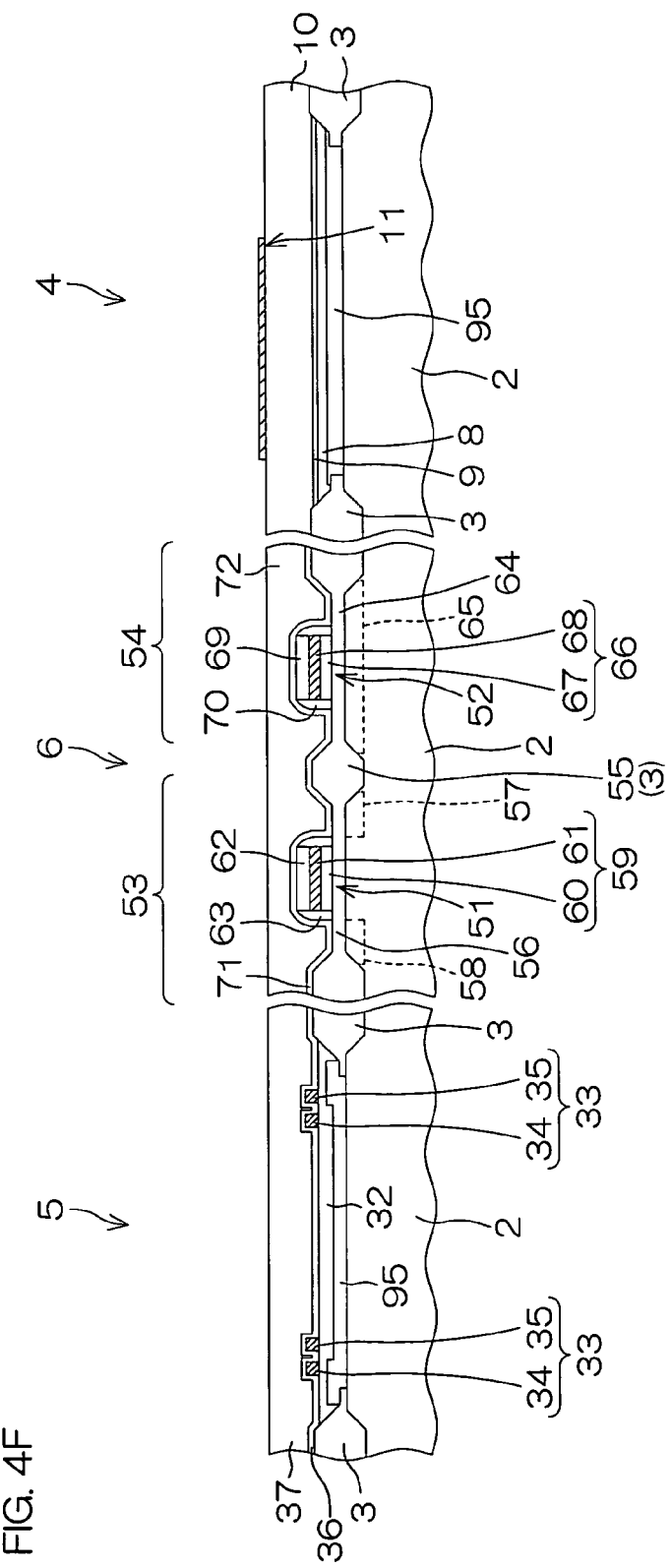
Figure 4G:
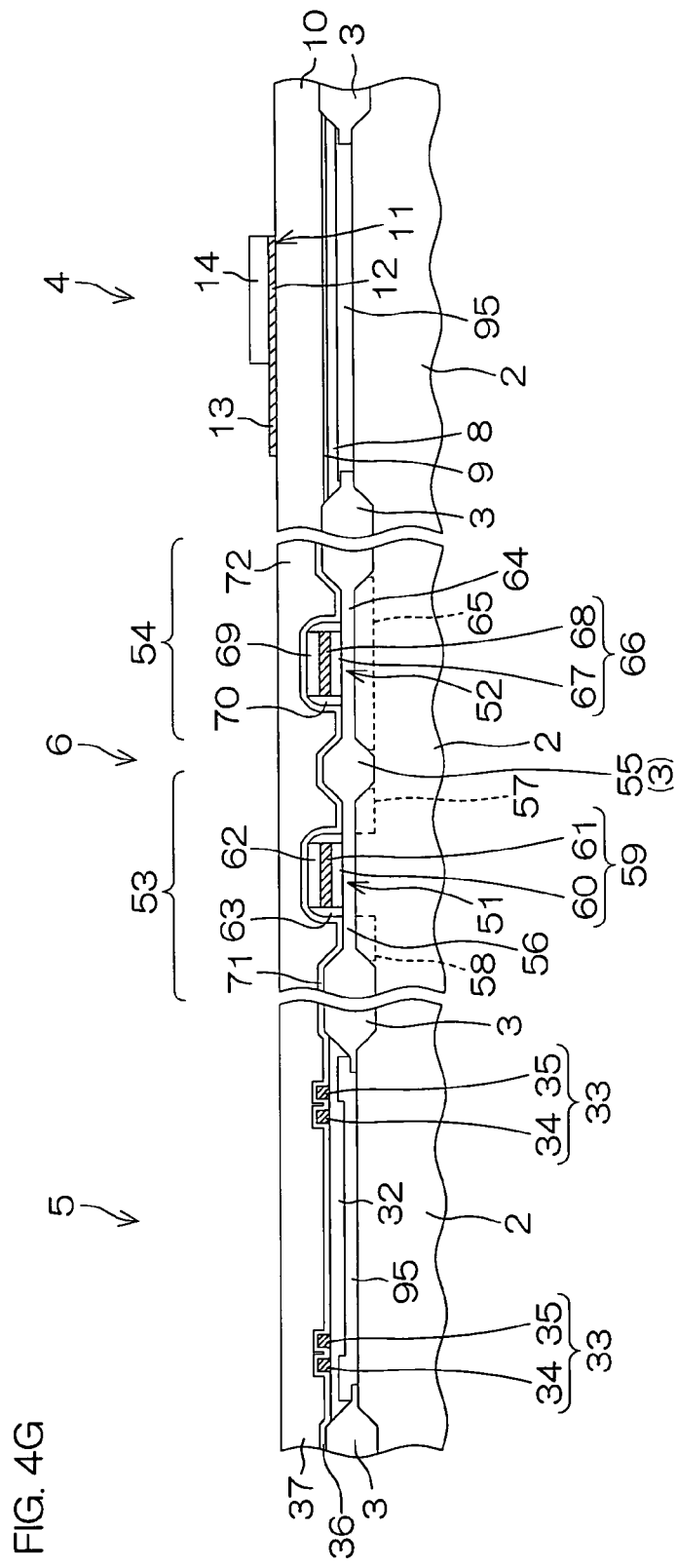
Figure 4H:
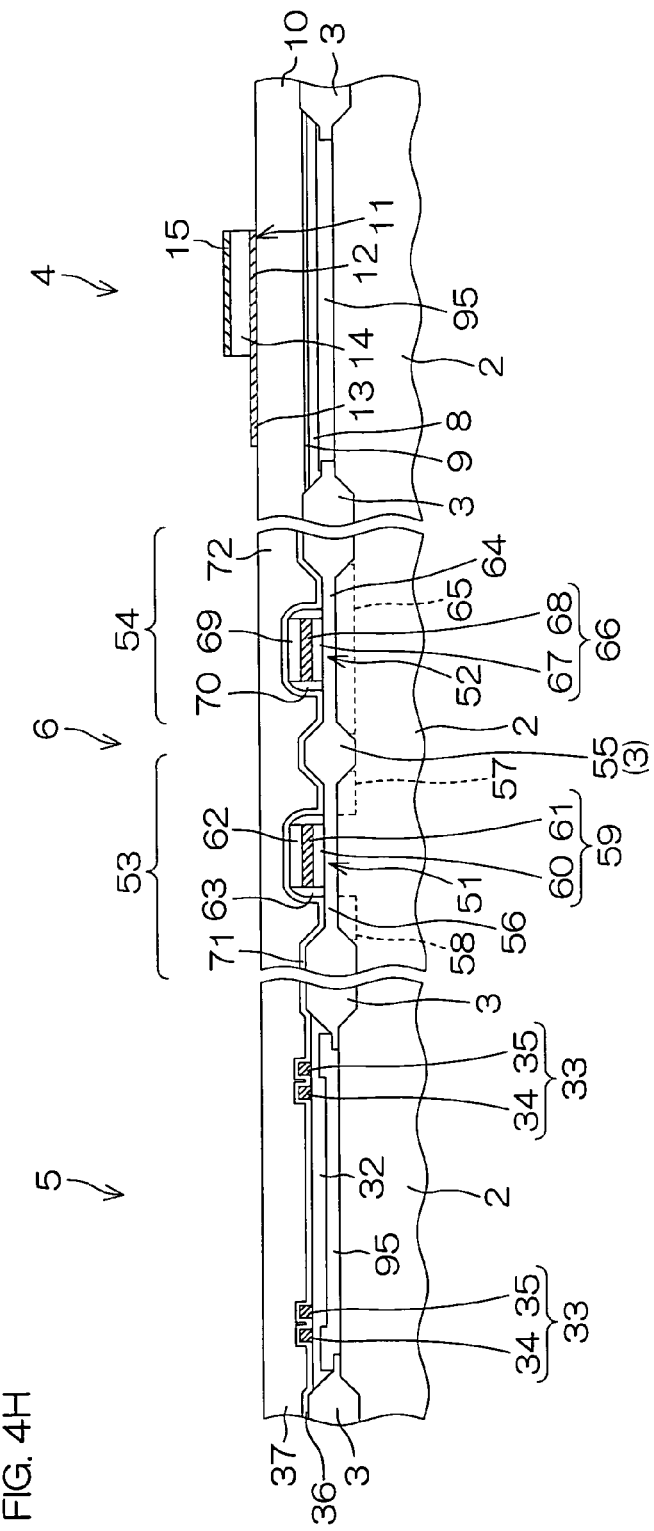
Figure 4I:
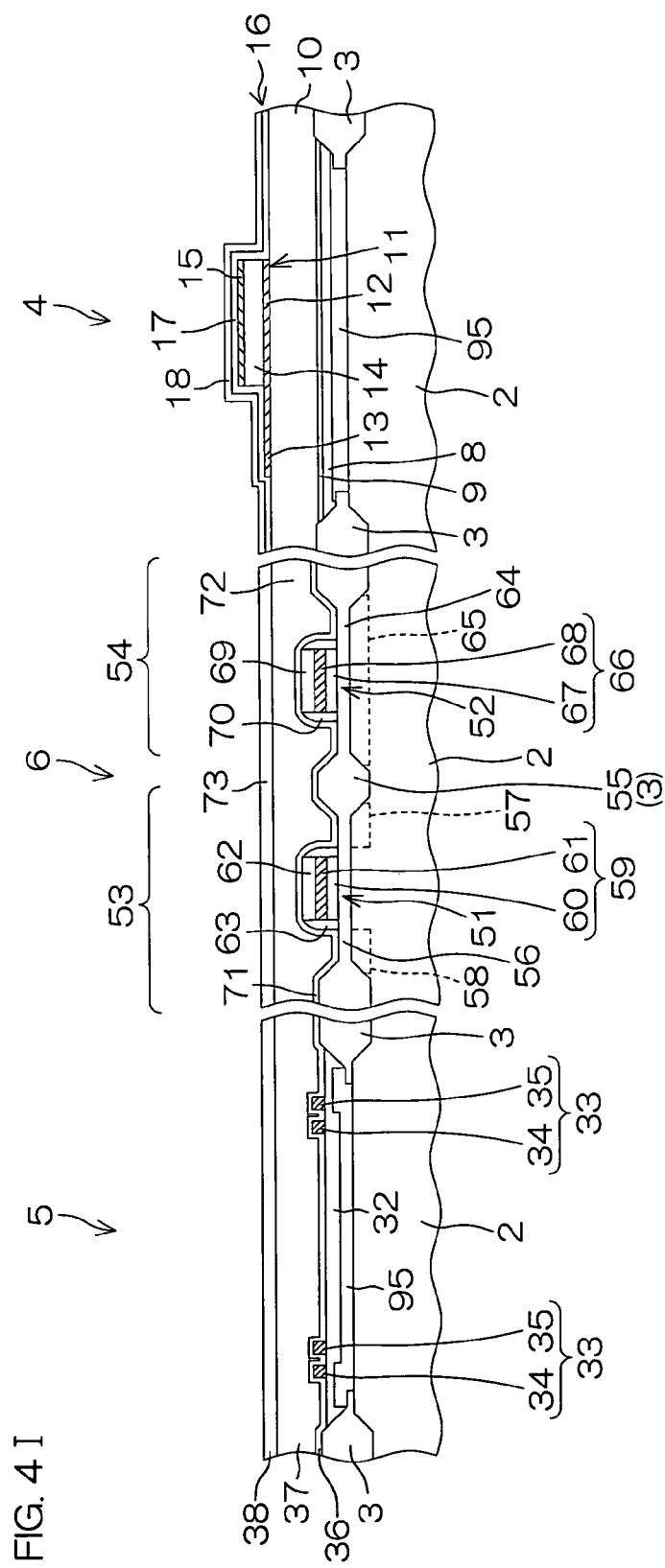
Figure 4J:
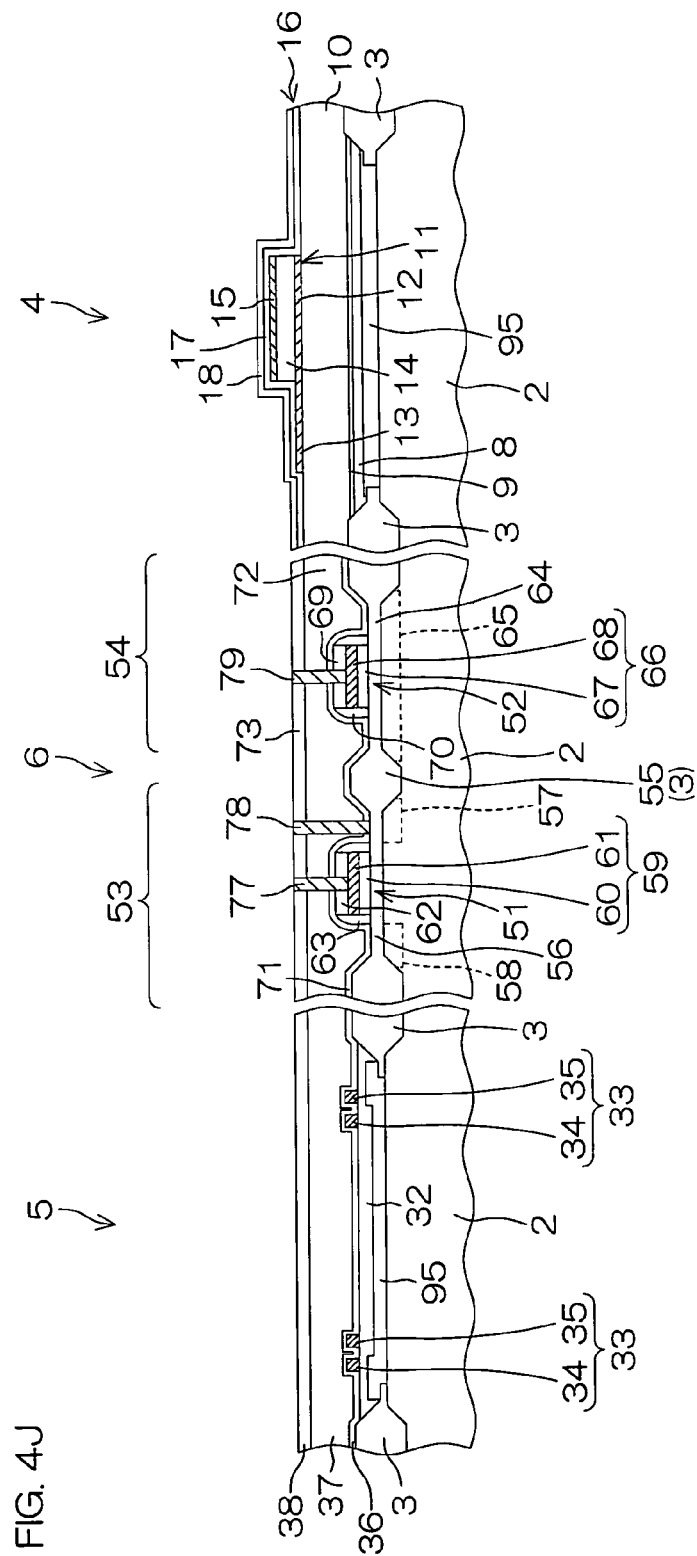
Figure 4K:
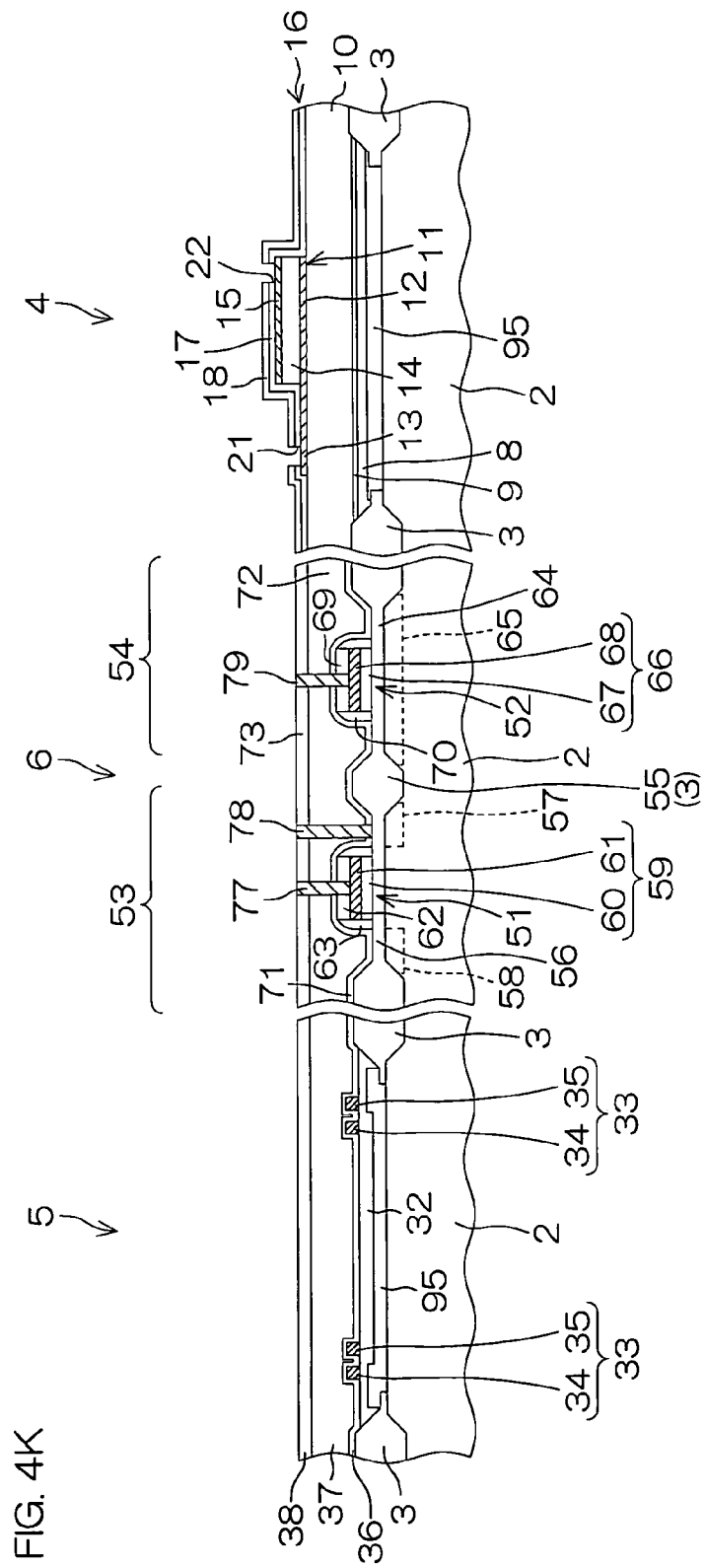
Figure 4L:
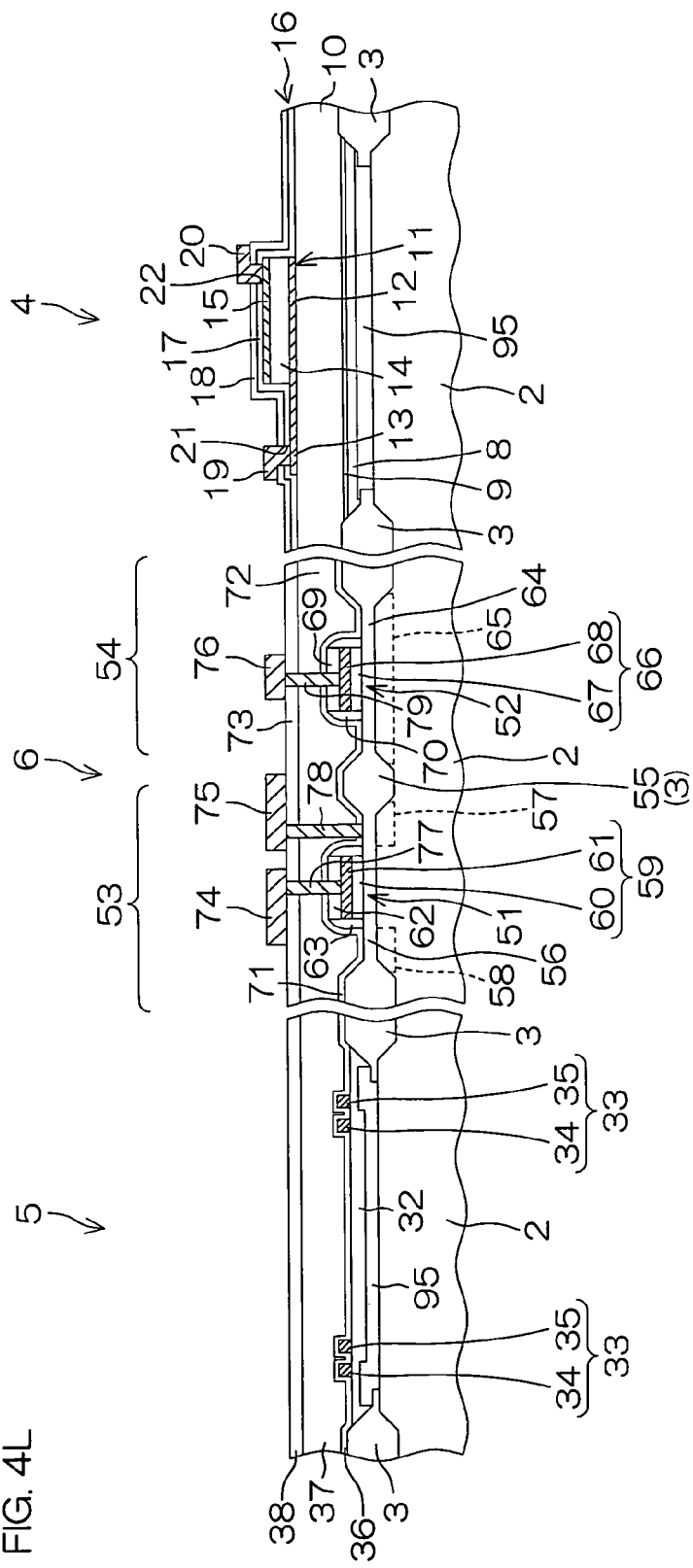
Figure 4M:
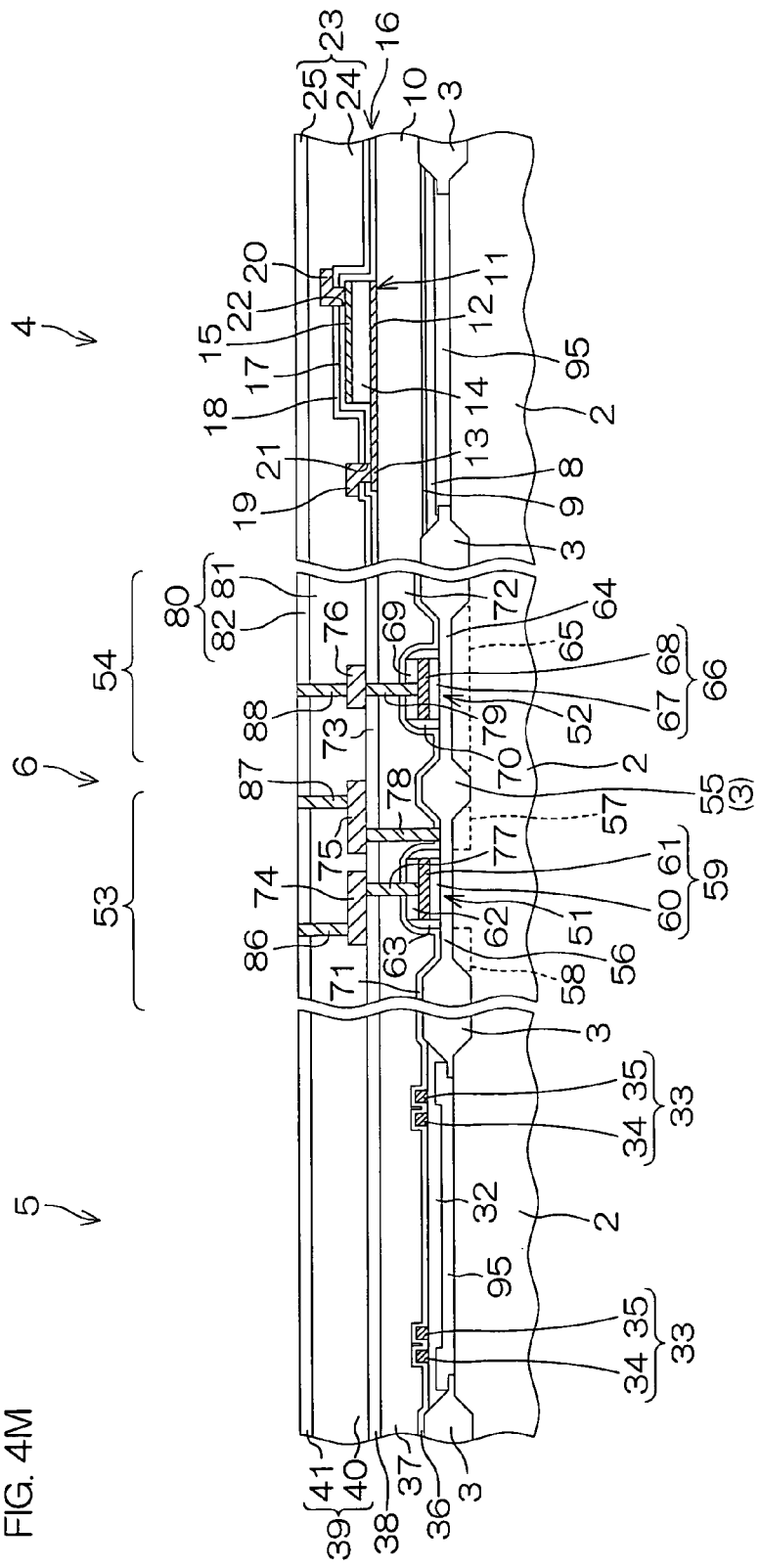
Figure 4N:
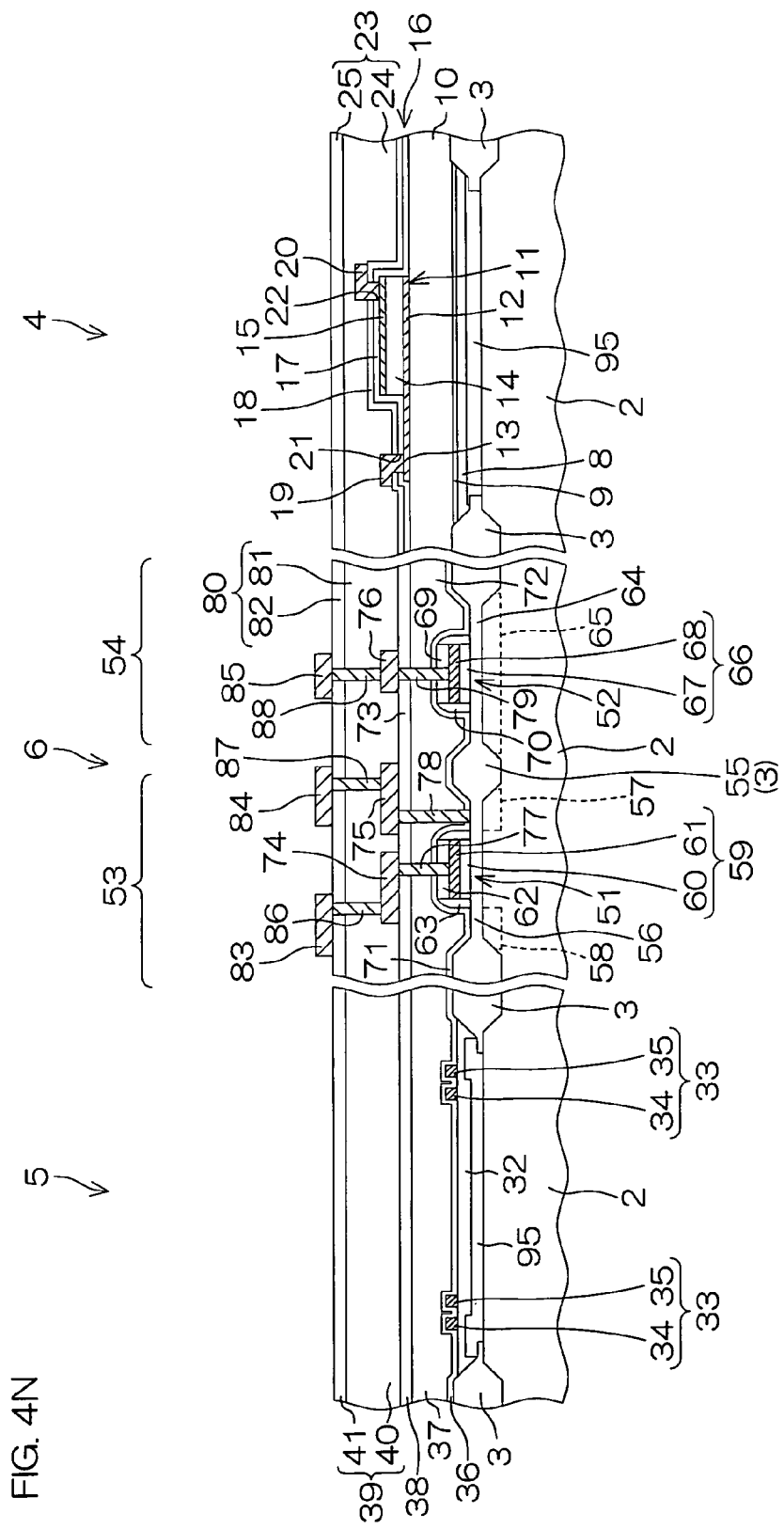
Figure 40:
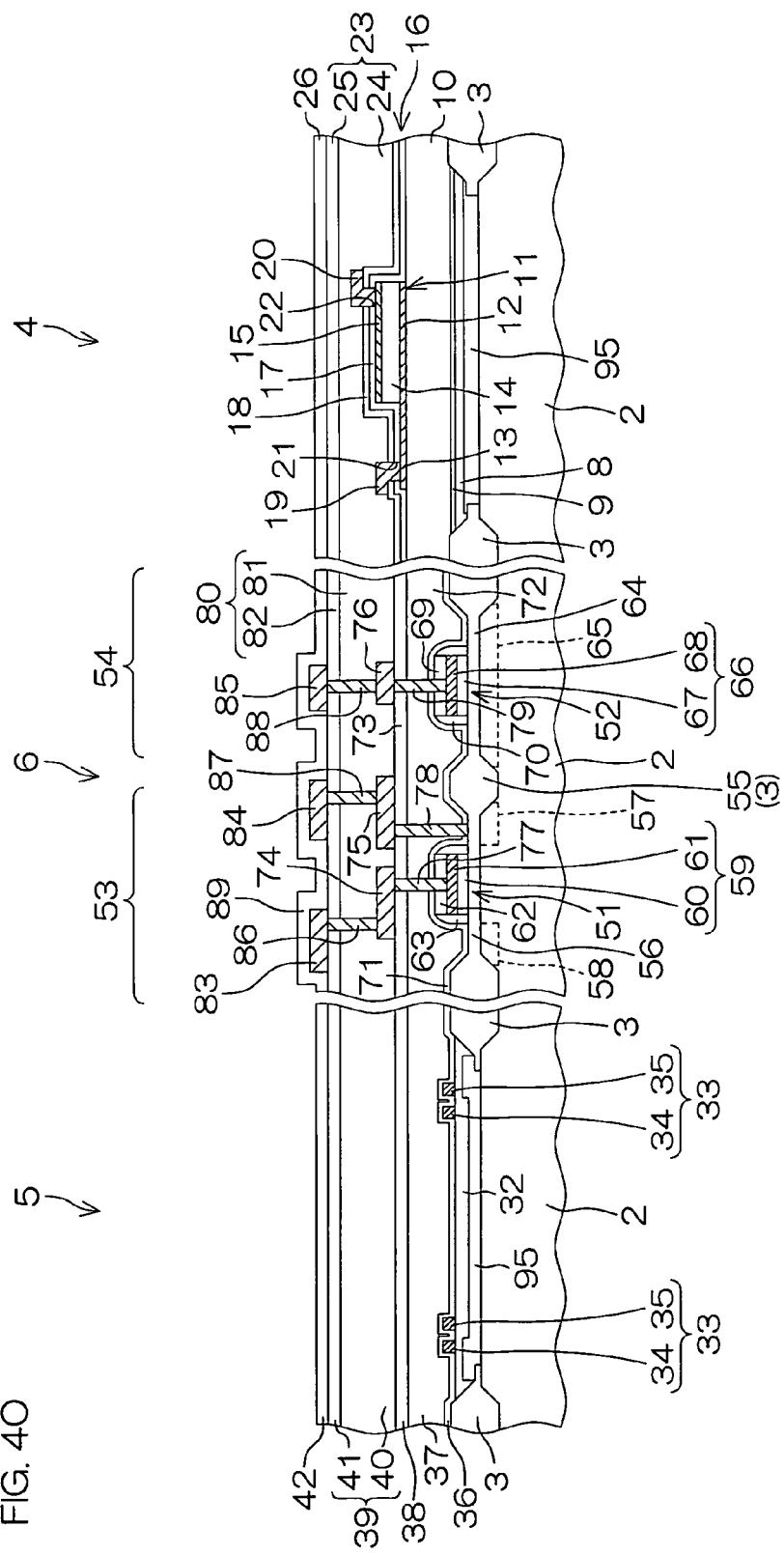
Figure 4P:
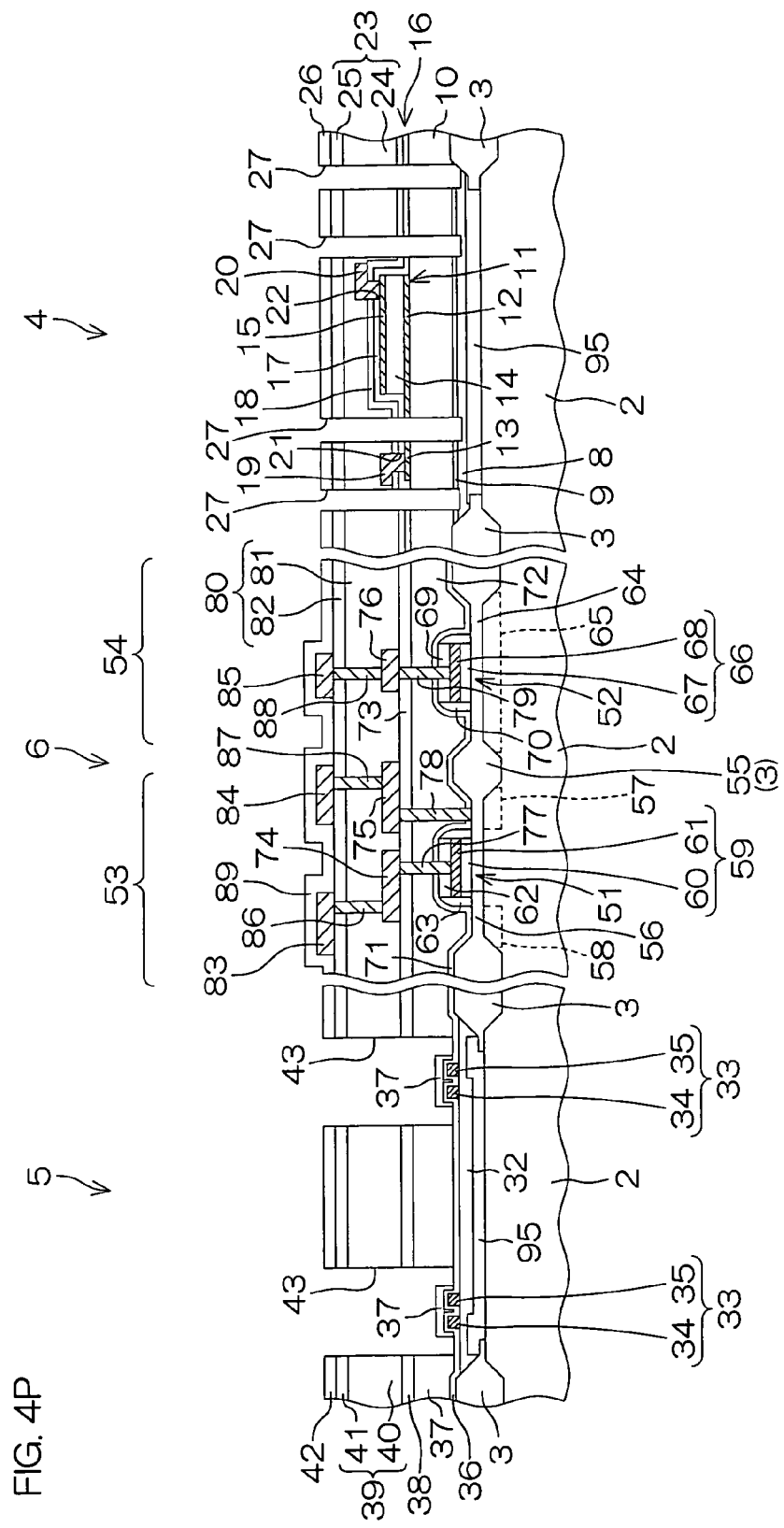
Figure 4Q:
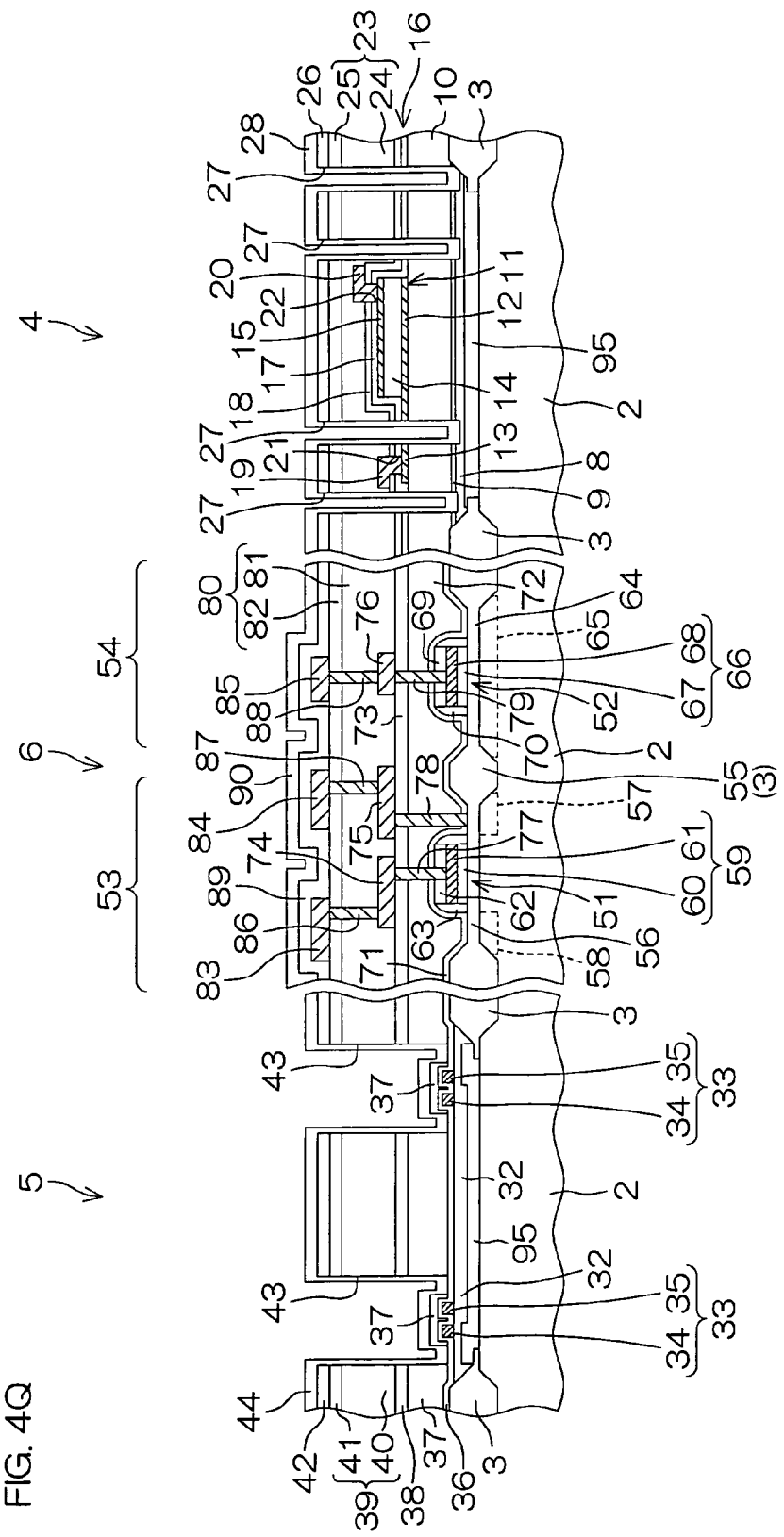
Figure 4R:
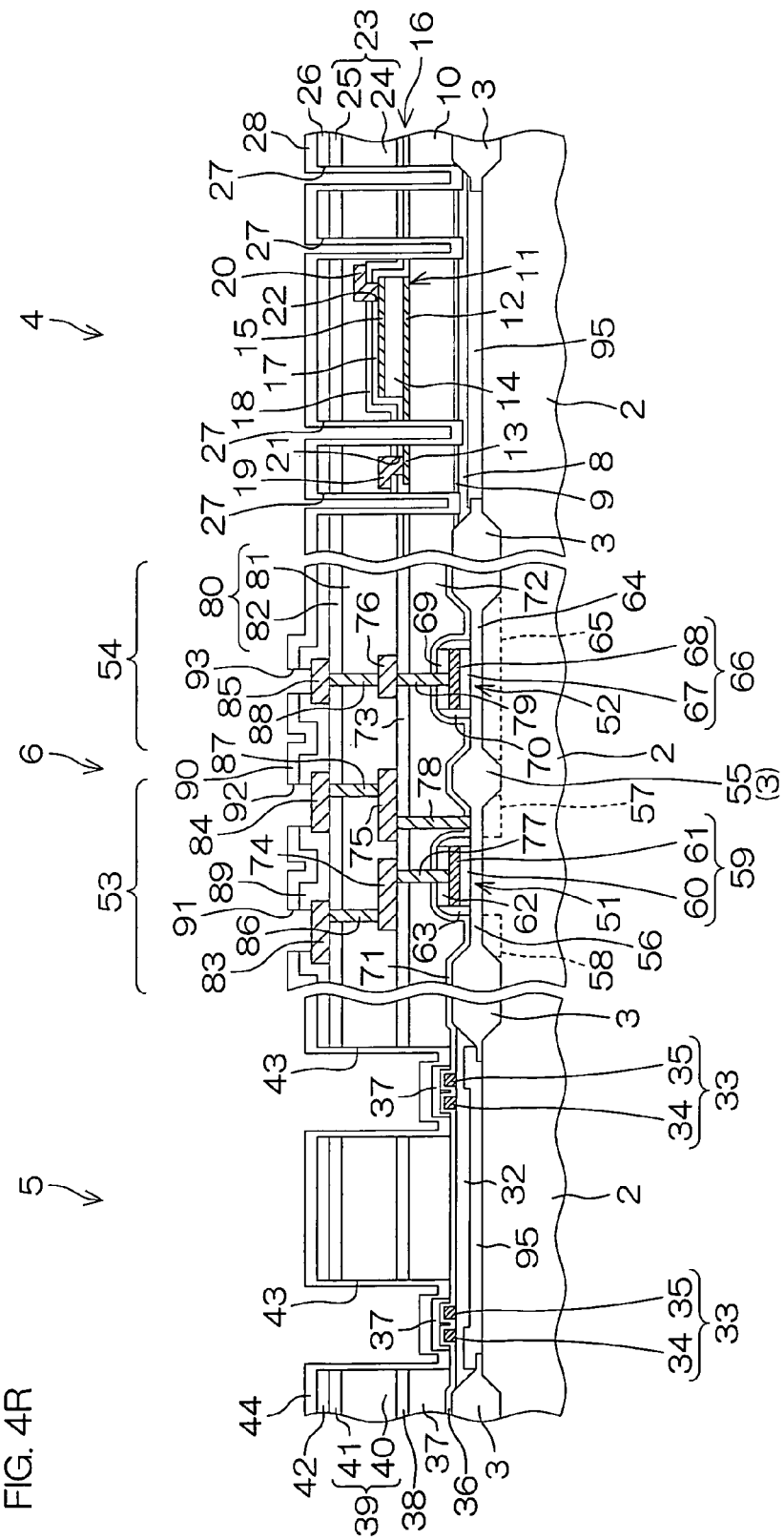
Figure 4S:
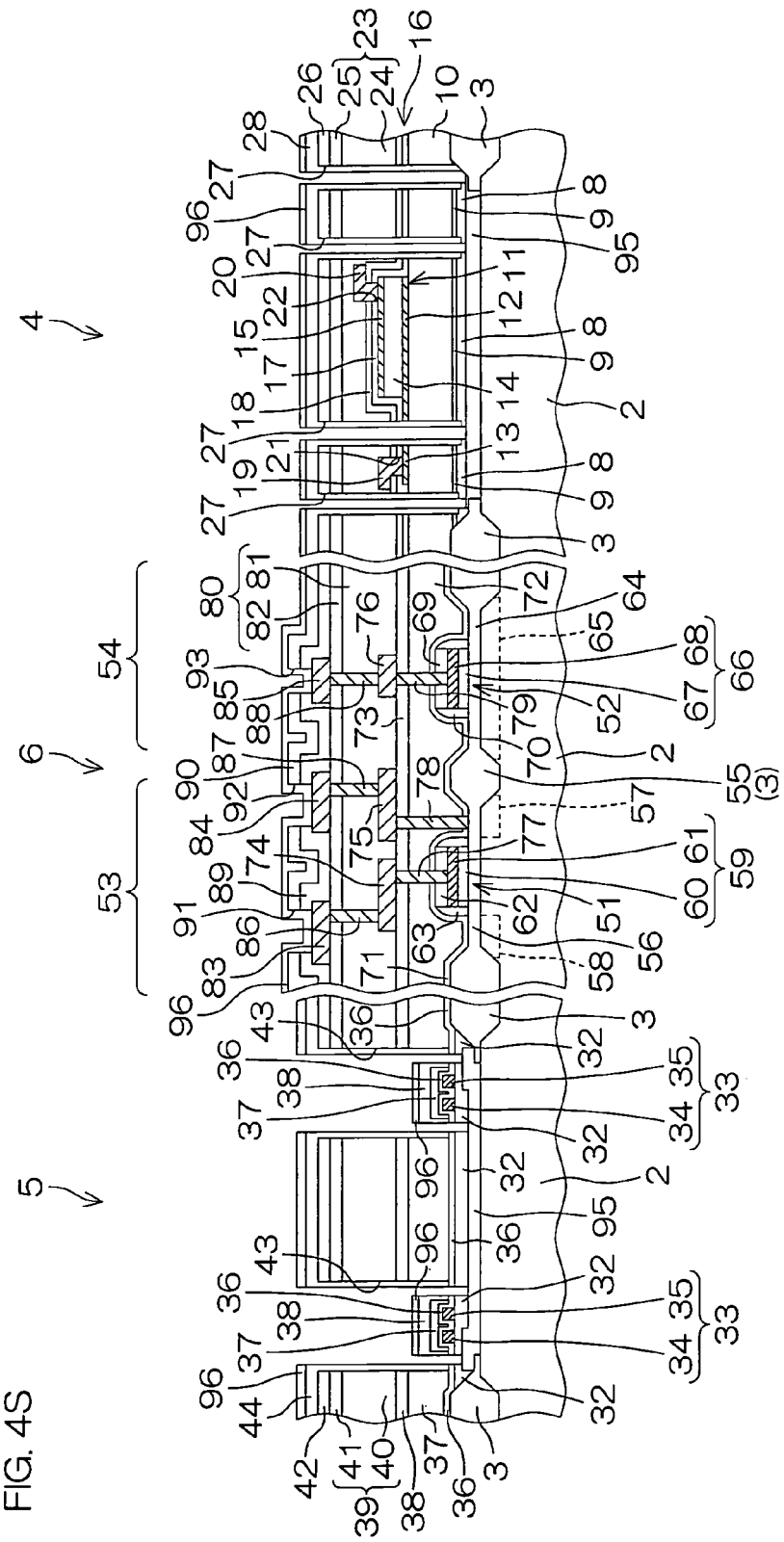

FIGS. 4A to 4S are schematic sectional views showing, in successive order, a manufacturing process of the infrared sensor shown in FIG. 2.

In the manufacturing process of the infrared sensor 1, first, the entire top surface of the silicon substrate 2 is oxidized by a thermal oxidation method as shown in FIG. 4A. The gate insulating film 56 and the capacitor insulating film 64 are thereby formed in the logic circuit region 6, and an oxide film is formed in the pyroelectric sensor region 4 and the thermopile region 5 so as to cover the entire top surfaces of these regions. Thereafter, the LOCOS films 3 and 55 are formed by the LOCOS method in the top surface of the silicon substrate 2. After the LOCOS films 3 and 55 have been formed, the oxide film is removed from the pyroelectric sensor region 4 and the thermopile region 5.

Then, as shown in FIG. 4B, a sacrificial layer 95 made of polysilicon is formed on the top surface of the silicon substrate 2 in the pyroelectric sensor region 4 and the sacrificial layer 95 made of polysilicon is formed on the top surface of the silicon substrate 2 in the thermopile region 5 by a CVD (chemical vapor deposition) method. Thereafter, the membrane 8 is formed on the sacrificial layer 95 and the membrane 32 is formed on the sacrificial layer 95 by photolithography.

Then, as shown in FIG. 4C, the MOSFET 51 and the capacitor 52 are formed in the logic circuit region 6. Specifically, a layer made of the material of the polysilicon layers 60 and 67, a layer made of the material of the metal layers 61 and 68, and a layer made of the material of the gate cap film 62 and the capacitor cap film 69 are laminated in that order from the silicon substrate 2 side onto the gate insulating film 56 and the capacitor insulating film 64 in the logic circuit region 6. The laminated films are then removed selectively by photolithography and etching. The polysilicon layer 60, the metal layer 61, and the gate cap film 62 are thereby formed on the gate insulating film 56, and the polysilicon layer 67, the metal layer 68, and the capacitor cap film 69 are formed on the capacitor insulating film 64.

An NSG film is thereafter deposited over the entire logic circuit region 6 by the CVD (chemical vapor deposition) method. The side walls 63 and 70 are then formed by etching back the NSG film.

Also, the source region 57, the drain region 58, and the impurity diffusion region 65 can be formed by doping a top layer portion of the silicon substrate 2 with an n-type impurity (for example, P (phosphorus)) and thereafter making the impurity diffuse.

Also, in the thermopile region 5, the conductive wires 34 and 35 are formed on the membrane 32 by photolithography and etching. The conductive wires 34 and 35 are formed by the same process as the metal layers 61 and 68.

Thereafter, as shown in FIG. 4D, the etching stopper films 9, 36, and 71 are formed on the top surfaces of the pyroelectric sensor region 4, the thermopile region 5, and the logic circuit region 6, respectively, by a reduced pressure CVD method.

Then, as shown in FIG. 4E, the first interlayer insulating films 10, 37, and 72 are formed on the entire top surfaces of the pyroelectric sensor region 4, the thermopile region 5, and the logic circuit region 6, respectively, by the CVD method.

Thereafter, a metal film made of the material of the lower electrode 11 is formed on the first interlayer insulating film 10 in the pyroelectric sensor region 4 by a sputtering method. The metal film is then removed selectively by photolithography and etching. The lower electrode 11 is thereby formed on the first interlayer insulating film 10 as shown in FIG. 4F.

Then, as shown in FIG. 4G, the pyroelectric element 14 is formed on the lower electrode 11. Specifically, first, a thin film of lead titanate zirconate is formed on a region including the top surface of the lower electrode 11 by the sol-gel method. The thin film is thereafter removed selectively by photolithography and etching. Portions of the thin film besides the portion formed on the main body portion 12 of the lower electrode 11 are thereby removed selectively and the thin-film pyroelectric element 14 is obtained.

Then, as shown in FIG. 4H, the upper electrode 15 is formed on the pyroelectric element 14 by the sputtering method.

Thereafter, as shown in FIG. 4I, the alumina film 17 is formed on the first interlayer insulating film 10 by the sputtering method. The silicon oxide film 18 is then formed on the alumina film 17 by the CVD method. The coating film 16 having the structure in which the alumina film 17 and the silicon oxide film 18 are laminated is thereby obtained on the first interlayer insulating film 10.

Also, in the thermopile region 5 and the logic circuit region 6, the cap layers 38 and 73 are formed on the first interlayer insulating films 37 and 72, respectively, by the CVD method.

Then, as shown in FIG. 4J, the vias 77, 78, and 79 are formed in the logic circuit region 6. The vias 77, 78, and 79 are formed by forming via holes penetrating through the first interlayer insulating film 72 and the cap layer 73 in the lamination direction in these layers and thereafter embedding tungsten inside the via holes.

Thereafter, as shown in FIG. 4K, through-holes 21 and 22 are formed in the coating film 16 in the pyroelectric sensor region 4 by photolithography and etching.

A metal film made of aluminum is then formed on the coating film 16, including the interiors of the through-holes 21 and 22, and on the cap layer 73 in the logic circuit region 6 by the sputtering method. By selective patterning of the metal film, the wirings 19 and 20 are formed and the first wirings 74, 75, and 76 connected to the respective vias 77, 78, and 79 are formed as shown in FIG. 4L.

Then, as shown in FIG. 4M, the second interlayer insulating films 23, 39, and 80 are formed. Specifically, first, the lower layers 24, 40, and 81 are formed by the CVD method, and in succession, the upper layers 25, 41, and 81 are formed on the lower layers 24, 40, and 81, respectively. The vias 86, 87, and 88 are then formed in the logic circuit region 6. The vias 86, 87, and 88 are formed by forming via holes in the second interlayer insulating film 80 and thereafter embedding tungsten inside the via holes.

Thereafter, a metal film made of aluminum is formed on the second interlayer insulating film 80 by the sputtering method.

By selective patterning of the metal film, the second wirings 83, 84, and 85 connected to the respective vias 86, 87, and 88 are formed as shown in FIG. 4N.

Then, as shown in FIG. 4O, the third interlayer insulating films 26, 42, and 89 that coat the entire top surfaces of the pyroelectric sensor region 4, the thermopile region 5, and the logic circuit regions 6 are formed on these regions by the CVD method.

Then, as shown in FIG. 4P, the through-holes 27 and are formed by photolithography and etching. In the pyroelectric sensor region 4, the through-holes 27 continuously penetrate through the membrane 8, the etching stopper film 9, the first interlayer insulating film 10, the coating film 16, the second interlayer insulating film 23, and the third interlayer insulating film 26.

In forming the through-holes 43, first, the thermocouples 33 and a portion opposite to the thermocouples 33 in the lamination direction are dug in from the upper surface by etching in the first interlayer insulating film 37, the cap layer 38, the second interlayer insulating film 39, and the third interlayer insulating film 42. The cap layer 38, the second interlayer insulating film 39, and the third interlayer insulating film 42 are thereby removed from above the thermocouple 33, and the film thickness of the first interlayer insulating film 37 is made thinner than in the remaining portions. Thereafter, the first interlayer insulating film 37, the cap layer 38, the second interlayer insulating film 39, and the third interlayer insulating film 42 are removed by etching from above regions surrounding the thermocouples 33. The through-holes 43 are thereby formed.

Thereafter as shown in FIG. 4Q, the passivation films 28, 44, and 90 are formed by the CVD method on the third interlayer insulating films 26, 42, and 89 including the inner surfaces of the through-holes 27 and 43.

The passivation film 90 and the third interlayer insulating film 89 are then removed selectively by photolithography and etching as shown in FIG. 4R. The pad openings 91, 92, and 93 that expose portions of the upper surfaces of the second wirings 83, 84, and 85, respectively, are thereby formed.

Then, as shown in FIG. 4S, portions of the membranes 8 and 32 and the etching stopper films 9 and 36 that face bottoms of the through-holes 27 and 43 are removed by etching. The sacrificial layer 95 is thereby exposed at the bottoms of the through-holes 27 and 43. An oxide film is formed on the portions of the sacrificial layer 95 exposed by the through-holes 27 and 43.

Thereafter, a pad protective film 96 made of PSG (phospho silicate glass) is formed by the CVD method on the passivation films 28, 44, and 90. The entireties of the pyroelectric sensor region 4, the thermopile region 5, and the logic circuit region 6 are exposed for 10 seconds to hydrofluoric acid (HF) of a concentration of 10%. The oxide film of the sacrificial layer 95 is thereby removed.

In succession, TMAH (aqueous solution of tetramethylammonium hydroxide) is supplied via the through-holes 27 and 43 to remove the sacrificial layer 95 and remove a top layer portion of the silicon substrate 2. The cavities 7 and 31 are thereby formed, and the infrared sensor 1 shown in FIG. 2 is obtained.

As described above, the thin-film pyroelectric elements 14 made of lead titanium zirconate are disposed on the silicon substrate 2. When a temperature of the pyroelectric elements 14 rises due to incidence of infrared rays, a pyroelectric current due to a change of intrinsic polarization of the pyroelectric elements 14 is output in accordance with the temperature. The infrared rays can thus be detected based on the pyroelectric current.

The cavities 7 of the shape dug in from the top surface of the silicon substrate 2 are formed at the portions of the silicon substrate 2 opposite the pyroelectric elements 14. The pyroelectric elements 14 are thereby thermally isolated from the silicon substrate 2 and escape of heat from the pyroelectric elements 14 to the silicon substrate 2 can thereby be prevented. Consequently, detection precision of infrared rays can be improved.

The thin-film pyroelectric elements 14 can be formed by the sol-gel method. With the sol-gel method, the thickness of the pyroelectric elements 14 can be made thinner in comparison to a method of forming the pyroelectric elements 14 by sintering of a powder raw material. The infrared sensor 1 using the pyroelectric elements 14 can thus be made thin.

The pyroelectric elements 14 are coated by the coating film 16. The pyroelectric elements 14 can thereby be protected against water, etc. Also, the coating film 16 includes the alumina film. Hydrogen reduction of the lead titanate zirconate, which is the material of the pyroelectric elements 14, can thus be prevented by a hydrogen barrier property of the alumina film. Degradation of characteristics of the pyroelectric elements 14 due to the hydrogen reduction can thus be prevented.

The MOSFET 51 and the capacitor 52 are formed in the silicon substrate 2. Further, the wirings 74, 75, and 76 are formed across the first interlayer insulating film 72 on the silicon substrate 2, and the wirings 74, 75, and 76 can be connected to the MOSFET 51 and the capacitor 52 via the vias 77, 78, and 79. A signal processing circuit that processes the pyroelectric currents (output signals) output from the pyroelectric elements 14, etc., can thus be incorporated in the infrared sensor 1.

Also, the thermocouples 33 are disposed on the silicon substrate 2. Infrared rays can be detected based on a voltage that is in accordance with a temperature difference between the hot junctions 44 and the cold junctions 46 of the thermocouples 33. Thus, either or both of the pyroelectric elements 14 and the thermocouples 33 can be used as the infrared detecting elements in accordance with application of the infrared sensor 1.

The through-holes 27 penetrating through the coating film 16 in the thickness direction are formed in the coating film 16, and the inner surfaces of the through-holes 27 are coated with the passivation film 28 made of silicon nitride. The coating film 16 is thereby not etched by the etching fluid (TMAH) even when the etching fluid is supplied to the silicon substrate 2 via the through-holes 27 to form the cavities 7 in the silicon substrate 2. The cavities 7 can thus be formed in the silicon substrate 2 without undesired etching of the coating film 16.

Besides the above, various design modifications may be applied within the scope of the matters described in the claims.

For example, although in the embodiment described above, the pyroelectric elements 14 are disposed in an array at an upper half of the paper surface of the central region of the silicon substrate 2 and the thermocouples 33 are disposed in an array at a lower half of the paper surface, the positional configuration of the pyroelectric elements 14 and the thermocouples 33 can be changed as suited. For example, the respective pyroelectric elements 14 and the thermocouples 33 may be aligned in staggered form as whole so that in the central region of the silicon substrate 2, the pyroelectric elements 14 of each column are not adjacent to the pyroelectric elements 14 of adjacent columns and the thermocouples 33 of each column are not adjacent to the thermocouples 33 of adjacent columns.

While preferred embodiments of the present invention have been described in detail above, these are merely specific examples used to clarify the technical contents of the present invention and the present invention should not be interpreted restrictively to these specific examples and the spirit and scope of the present invention is to be determined solely by the following claims.

The present application corresponds to Japanese Patent Application No. 2010-44180 filed in the Japan Patent Office on Mar. 1, 2010, and the entire disclosure of this application is incorporated herein by reference.

What is claimed is:

1. An infrared sensor comprising:
   a semiconductor substrate on which a pyroelectric sensor region, a thermopile region, and a logic circuit region are provided;
   a thin-film pyroelectric element made of lead titanate zirconate and disposed in the pyroelectric sensor region;
   a coating film coating the pyroelectric element and having a topmost surface forming a light receiving surface for infrared rays;
   a cavity in the semiconductor substrate and formed at a top surface of the semiconductor substrate at a portion opposite to the pyroelectric element and thermally isolating the pyroelectric element from the semiconductor substrate; and
   a thermocouple disposed in the thermopile region, wherein
   the pyroelectric sensor region and the thermopile region are consolidated and formed in a central region of the semiconductor substrate so as to be surrounded by the logic circuit region.

2. The infrared sensor according to claim 1, wherein the coating film includes an alumina film.

3. The infrared sensor according to claim 1, wherein the coating film has a two-layer structure in which an alumina film and a silicon oxide film are laminated in that stated order from a side that includes the semiconductor substrate.

4. The infrared sensor according to claim 1, further wherein the logic circuit region includes:
   an active element formed in the semiconductor substrate; and
   a wiring electrically connected to the active element.

5. The infrared sensor according to claim 1, wherein
   the thermocouple includes a first thermocouple and a second thermocouple,
   the first thermocouple is made of a pair of conductive wires that includes a first conductive wire and a second conductive wire that are mutually spaced apart and extend in parallel,
   the second thermocouple is made of a pair of conductive wires that includes a third conductive wire and a fourth conductive wire that are mutually spaced apart and extend in parallel,
   one end of the first conductive wire and one end of the third conductive wire are connected at a connection portion, one end of the second conductive wire and one end of the fourth conductive wire are connected at a connection portion, and the connection portions form hot junctions.

6. The infrared sensor according to claim 5, further comprising another cavity for thermally isolating the hot junctions from the semiconductor substrate and being formed in the semiconductor substrate at a portion of the semiconductor substrate opposite to the thermocouple.

7. The infrared sensor according to claim 6, wherein in a plan view, the first conductive wire and the second conductive wire of the first thermocouple are disposed so as to be 180° rotationally symmetric about a center of the another cavity with respect to the third conductive wire and the fourth conductive wire of the second thermocouple.

8. The infrared sensor according to claim 1,
wherein the semiconductor substrate is a silicon substrate,
further wherein a through-hole penetrating through the coating film in a thickness direction is formed in the coating film, and
the infrared sensor further comprises a silicon nitride film made of silicon nitride that is coated on an inner surface of the through-hole.

9. The infrared sensor according to claim 1, wherein the cavity is formed to have a trapezoidal cross-sectional shape that narrows as a rear surface of the semiconductor substrate is approached.

10. The infrared sensor according to claim 1, further comprising:
a membrane closing the cavity from a top surface side of the semiconductor substrate;
a lower electrode formed on the membrane and contacting the pyroelectric element from a rear surface of the pyroelectric element; and
an upper electrode formed on the pyroelectric element and contacting the pyroelectric element from a top surface side of the pyroelectric element.

11. The infrared sensor according to claim 10, wherein
the lower electrode includes a main body portion being in contact with the pyroelectric element, and an extending portion extending along a top surface of the semiconductor substrate from the main body portion.

12. The infrared sensor according to claim 10, wherein
the lower electrode has a two-layer structure in which a layer made of titanium and a layer made of platinum are laminated in that stated order from a side that includes the membrane.

13. The infrared sensor according to claim 10, wherein
the upper electrode has a two-layer structure in which a layer made of iridium and a layer made of iridium oxide are laminated in that stated order from a side that includes the pyroelectric element.

14. A sensor device comprising:
a silicon substrate on which a pyroelectric sensor region, a thermopile region, and a logic circuit region are provided;
a pyroelectric element disposed in the pyroelectric sensor region;
a cavity formed below the pyroelectric element in the silicon substrate; and
a thermocouple disposed in the thermopile region, wherein
the pyroelectric sensor region and the thermopile region are consolidated and formed in a central region of the silicon substrate so as to be surrounded by the logic circuit region, and
the logic circuit region has a transistor.

15. The sensor device according to claim 14, further comprising a cavity formed below the thermocouple in the silicon substrate.

16. An infrared sensor device having the sensor device according to claim 14, wherein the pyroelectric element includes an element made of lead titanate zirconate and detects infrared rays by a pyroelectric effect.

17. An infrared sensor device having the sensor device according to claim 16, further comprising: a coating film coating the pyroelectric element and having a topmost surface forming a light receiving surface for infrared rays.

18. An infrared sensor device having the sensor device according to claim 17, wherein the coating film includes an alumina film.

19. An infrared sensor device having the sensor device according to claim 17, wherein the coating film has a two-layer structure in which an alumina film and a silicon oxide film are laminated in that stated order from a side that includes the silicon substrate.

20. An infrared sensor device having the sensor device according to claim 16, wherein the cavity below the pyroelectric thermally isolates the pyroelectric element from the silicon substrate.

21. The sensor device according to claim 14, wherein the transistor includes a MOS transistor.

22. The sensor device according to claim 14, wherein the logic circuit region includes a capacitor formed on the silicon substrate.

23. The sensor device according to claim 14, further comprising:
a membrane closing the cavity below the pyroelectric element from a top surface side of the silicon substrate;
a lower electrode formed on the membrane and contacting the pyroelectric element from a rear surface of the pyroelectric element; and
an upper electrode formed on the pyroelectric element and contacting the pyroelectric element from a top surface side of the pyroelectric element.

24. A sensor device comprising:
a silicon substrate on which a pyroelectric sensor region, a thermopile region, and a logic circuit region are provided;
a pyroelectric element disposed in the pyroelectric sensor region; and
a thermocouple disposed in the thermopile region, wherein
the pyroelectric sensor region and the thermopile region are consolidated and formed in a central region of the silicon substrate so as to be surrounded by the logic circuit region.

25. The sensor device according to claim 24, wherein the pyroelectric element is for detecting infrared rays, and the thermocouple is for detecting infrared rays.

26. The infrared sensor according to claim 1, wherein the pyroelectric element is for detecting infrared rays, and the thermocouple is for detecting infrared rays.

27. The sensor device according to claim 14, wherein the pyroelectric element is for detecting infrared rays, and the thermocouple is for detecting infrared rays.

28. The infrared sensor according to claim 5, wherein the first conductive wire and the second conductive wire of the first thermocouple extend in a first direction from the hot junctions, then bend to extend in a second direction that forms a 90° angle with the first direction, and then bend to extend in a third direction that forms a 90° angle with the second direction, so as to fold back and then extend.

29. The infrared sensor according to claim 28, further comprising another cavity for thermally isolating the hot junctions from the semiconductor substrate and being formed in the semiconductor substrate at a portion of the semiconductor substrate opposite to the thermocouple,
wherein the third conductive wire and the fourth conductive wire of the second thermocouple are disposed so as to be 180° rotationally symmetric about a center of the another cavity with respect to the first conductive wire and the second conductive wire of the first thermocouple.

30. The sensor device according to claim 14, wherein
the thermocouple includes a first thermocouple and a second thermocouple, the first thermocouple is made of a pair of conductive wires that includes a first conductive wire and a second conductive wire that are mutually spaced apart and extend in parallel, the second thermocouple is made of a pair of conductive wires that includes a third conductive wire and a fourth conductive wire that are mutually spaced apart and extend in parallel, one end of the first conductive wire and one end of the third conductive wire are connected at a connection portion, one end of the second conductive wire and one end of the fourth conductive wire are connected at a connection portion, and the connection portions form hot junctions, and the first conductive wire and the second conductive wire of the first thermocouple extend in a first direction from the hot junctions, then bend to extend in a second direction that forms a 90° angle with the first direction, and then bend to extend in a third direction that forms a 90° angle with the second direction, so as to fold back and then extend.

31. The sensor device according to claim 30, further comprising another cavity for thermally isolating the hot junctions from the substrate and being formed in the substrate at a portion of the substrate opposite to the thermocouple, wherein the third conductive wire and the fourth conductive wire of the second thermocouple are disposed so as to be 180° rotationally symmetric about a center of the another cavity with respect to the first conductive wire and the second conductive wire of the first thermocouple.

32. The sensor device according to claim 24, wherein the thermocouple includes a first thermocouple and a second thermocouple, the first thermocouple is made of a pair of conductive wires that includes a first conductive wire and a second conductive wire that are mutually spaced apart and extend in parallel, the second thermocouple is made of a pair of conductive wires that includes a third conductive wire and a fourth conductive wire that are mutually spaced apart and extend in parallel, one end of the first conductive wire and one end of the third conductive wire are connected at a connection portion, one end of the second conductive wire and one end of the fourth conductive wire are connected at a connection portion, and the connection portions form hot junctions, and the first conductive wire and the second conductive wire of the first thermocouple extend in a first direction from the hot junctions, then bend to extend in a second direction that forms a 90° angle with the first direction, and then bend to extend in a third direction that forms a 90° angle with the second direction, so as to fold back and then extend.

33. The sensor device according to claim 32, further comprising another cavity for thermally isolating the hot junctions from the substrate and being formed in the substrate at a portion of the substrate opposite to the thermocouple, wherein the third conductive wire and the fourth conductive wire of the second thermocouple are disposed so as to be 180° rotationally symmetric about a center of the another cavity with respect to the first conductive wire and the second conductive wire of the first thermocouple.

\* \* \* \* \*